United States Patent [19]

Takahama et al.

[11] Patent Number: 5,444,495
[45] Date of Patent: Aug. 22, 1995

[54] MUSE-NTSC CONVERTER HAVING TWO OSCILLATORS

[75] Inventors: Akiko Takahama; Masahiko Nakamura, both of Itami; Hiroyuki Nakayama, Nagaokakyo; Eiji Arita, Nagaokakyo; Yoichi Asamoto, Nagaokakyo, all of Japan

[73] Assignee: Mitsubishi Denki Kabushiki Kaisha, Tokyo, Japan

[21] Appl. No.: 294,401

[22] Filed: Aug. 23, 1994

[30] Foreign Application Priority Data

Aug. 23, 1993 [JP]  Japan .................................. 5-207790

[51] Int. Cl.$^6$ .................................................. H04N 7/01
[52] U.S. Cl. ........................................ 348/458; 548/443; 548/457
[58] Field of Search ............... 348/424, 458, 459, 443, 348/235, 536, 505, 444, 457; H04N 7/01

[56] References Cited

U.S. PATENT DOCUMENTS 5,031,040  7/1991  Maruyama ........................ 348/458
5,159,437  10/1992  Lee ..................................... 348/443

OTHER PUBLICATIONS

Japan Television Society Journal, vol. 45, No. 11, 1991, pp. 1374–1377, Yoshiki Mizutani, "5-2-3 Muse-NTSC Converter".

*Primary Examiner*—Victor R. Kostak
*Attorney, Agent, or Firm*—Oblon, Spivak, McClelland, Maier, & Neustadt

[57] ABSTRACT

A MUSE-NTSC converter of a relatively simple and small scale circuit design. An oscillation signal from a 28.63636 MHz oscillator (20) is eight times as large as a subcarrier frequency fsc. A Y image processing circuit (17) and a chroma encoder (18) can perform various kinds of processing, such as dividing a frequency of the oscillation signal from the 28.63636 MHz oscillator (20) and the like, to produce a subcarrier frequency. A signal separating circuit (3') receives the oscillation signal from the 28.63636 MHz oscillator (20) as a single system clock and performs some kinds of signal processing which vary from a full wide mode to a zoom mode. Thus, in performing PLL on system clocks in the MUSE mode and the NTSC mode, there may be only one PLL circuit (21) for synchronizing an oscillation signal from a 32.4 MHz oscillator (19) and the oscillation signal from the 28.63636 MHz oscillator (20) in phase.

15 Claims, 25 Drawing Sheets

MUSE-NTSC CONVERTER HAVING TWO OSCILLATORS

BACKGROUND OF THE INVENTION

1. Field of the Invention

The present invention relates to a MUSE (Multiple Subnyquiest Sampling Encoding)—NTSC (National Television System Committee) converter capable of transforming a high-vision signal transmitted in the MUSE mode into a signal which can be reproduced on an NTSC monitor.

2. Description of the Background Art

High-vision satellite broadcasting in the MUSE mode is in transition from experimental broadcasting to pilot broadcasting, and the desire to receive high-vision broadcasting at home will probably expand more and more.

The MUSE is not compatible with the current standard NTSC. Thus, a high-vision receiver having a decoder for MUSE signals named "MUSE decoder" built therein is necessary to receive high-vision broadcasting.

On the other hand, there is a strong desire to enjoy high-vision broadcasting on the currently available receiver, and to implement it, a mode converter for varying a MUSE signal into the current NTSC mode, namely, a MUSE-NTSC converter, is necessary and some have been commercially available.

FIG. 27 is a block diagram showing a configuration of the prior art MUSE-NTSC converter. The MUSE-NTSC converter is, for example, disclosed in "MUSE-NTSC CONVERTER," Academic Report of the Television Society 1991 Vol. 45, No. 11, 5-2-3, written by Yoshiki Mizutani, published by the Television Society, Inc.

Referring to FIG. 27, the MUSE-NTSC converter includes an input signal processing circuit 1 for executing input processing on a MUSE signal SM, a time-base transforming circuit 2 for transforming a MUSE mode input signal into an NTSC mode signal on the time-base, a signal separating circuit 3 for separating the NTSC mode signal from the time-base transforming circuit 2 into a luminance signal Y and color difference signals R-Y and B-Y, a Y vertical filter 4 for transforming the luminance signal Y from 1125 scanning lines into 525 scanning lines, a time expander 5 for expanding durations of the color difference signals R-Y and B-Y to four times as long as their initial durations, a C vertical filter 6 for transforming the color difference signals R-Y and B-Y in accord with a treatment of the luminance signal Y transformed by the Y vertical filter 4, and a vertical compressor 7 for further compressing the scanning lines of the transformed luminance signal Y and color difference signals R-Y and B-Y to $\frac{2}{3}$. The luminance signal Y and the color difference signals R-Y and B-Y processed in the Y vertical filter 4 and the C vertical filter 6 are directly applied to a first input 8a of a 2-1 selector 8 while the luminance signal Y and the color difference signals R-Y and B-Y processed in the vertical compressor 7 are applied to a second input 8b of the 2-1 selector 8.

The 2-1 selector 8 selects one of the signals received on the first and second inputs 8a and 8b in accordance with a control signal not shown to output it to an image processing circuit 9. The image processing circuit 9 performs various kinds of processing on the signals output from the 2-1 selector 8 to apply the resultant signals to a D-A converter 10. The D-A converter 10 converts a digital signal received from the image processing circuit 9 into an analog signal to output it to the outside and to an NTSC chroma encoder 11. The NTSC chroma encoder 11 produces an NTSC mode chroma signal based upon a signal received from the D-A converter 10. The MUSE-NTSC converter further includes a 16.2 MHz oscillator 12 for producing a 16.2 MHz oscillation signal as a MUSE mode system clock, a 14.742 MHz oscillator 13 for producing a 14.742 MHz oscillation signal as a system clock for both a transformation mode which keeps a roundness ratio on a 16:9 monitor (referred to as "full mode" hereinafter) and a transformation mode which keeps a roundness ratio on a 4:3 monitor by transforming about the whole in the horizontal direction and reducing a transformation rate in the vertical direction to $\frac{2}{3}$ (referred to as "wide mode" hereinafter), a 10.08 MHz oscillator 14 for producing a 10.08 MHz oscillation signal as a system clock for a transformation mode which keeps a roundness ratio on a 4:3 monitor by truncating in the horizontal direction (referred to as "zoom mode" hereinafter), and a 3.579545 MHz oscillator 15 for producing a 3.579545 MHz oscillation signal as a system clock used for producing a subcarrier for the NTSC chroma encoder 11.

The oscillation signal from the 16.2 MHz oscillator 12 is applied to the input signal processing circuit 1 and the time-base transforming circuit 2, one of the oscillation signals from the 14.742 MHz oscillator 13 and 10.08 MHz oscillator 14 is applied to the time-base transforming circuit 2, signal separating circuit 3, Y vertical filter 4, time expander 5, C vertical filter 6, vertical compressor 7 and D-A converter 10, and the oscillation signal from the 3.579545 MHz oscillator 15 is applied to the NTSC chroma encoder 11.

An operation of the MUSE-NTSC converter will be described below. The MUSE signal SM, after undergoing various kinds of processing such as deemphasis, control signal detection, PLL and the like in the input processing circuit 1, is transformed on the time-base by the time-base transforming circuit 2.

Specifically, the time-base transforming circuit 2 groups the signal previously processed into odd lines and even lines to separately input them into a time-base transforming memory and receives the 16.2 MHz oscillation signal from the 16.2 MHz oscillator while it also receives the oscillation signal from the 14.742 MHz oscillator 13 via the 2-1 selector 59 in the full mode or the wide mode to transform the system clock from 32.4 MHz to 14.742 MHz. Meanwhile in the zoom mode, the time-base transforming circuit 2 receives the 16.2 MHz oscillation signal while it receives the oscillation signal from the 10.08 MHz oscillator 14 via the 2-1 selector 59 to transform the system clock from 32.4 MHz to 10.08 MHz.

The signal transformed on the time-base is separated into the luminance signal Y and the color difference signals R-Y and B-Y by the signal separating circuit 3; the luminance signal Y is applied to the Y vertical filter 4 while the color difference signals R-Y and B-Y are applied to the time expander 5.

The Y vertical filter 4 reduces the MUSE luminance signal Y in number from 1032 effective scanning lines to 516 scanning lines. In other words, it makes a single scanning line of two scanning lines.

On the other hand, the color difference signals R-Y and B-Y have their respective durations compressed to ¼ when they are a MUSE signal, and therefore, they are expanded on the time basis four times by the time expander 5. The time-expanded color difference signals are filtered by the C vertical filter 6 so as to control vertical centering with the Y scanning lines. Since the color difference signal is transmitted in alternations of 516 lines, the scanning lines are not transformed but processed with separate filters from line to line so as to control vertical centering of both the color difference signals R-Y and B-Y with the luminance signal Y.

The color difference signals R-Y and B-Y vertically in phase with the luminance signal Y which has undergone scanning transformation are transformed are appropriately selected by the 2-1 selector 8 and coupled to the D-A converter via the image processing circuit 9 in the full mode and the zoom mode while, in the wide mode, these signals, after their effective vertical scanning lines are transformed to $\frac{2}{3}$ by the vertical compressor 7, are coupled to the D-A converter via the image processing circuit 9.

For the signals transformed in the full mode, zoom mode or wide mode, the image processing circuit 9 performs various kinds of image processing such as outline modification and the like, and then the D-A converter 10 converts them into analog signals.

The NTSC chroma encoder 11 uses a subcarrier produced based upon the oscillation signal from the 3.579545 MHz oscillator 15 to modulate the analog-transformed color difference signals R-Y and B-Y into NTSC mode chroma signals.

The prior art MUSE-NTSC converter is configured as mentioned above, and usually it requires a first PLL circuit for synchronizing the oscillation signal from the 16.2 MHz oscillator 12 with the oscillation signal from the 14.742 MHz oscillator 13 in phase, a second PLL circuit for synchronizing the oscillation signal from the 16.2 MHz oscillator 12 with the oscillation signal from the 10.08 MHz oscillator 14 in phase, and a third PLL circuit for synchronizing the oscillation signal from the 16.2 MHz oscillator 12 with the oscillation signal from the 3.579545 MHz oscillator 15 in phase, in performing PLL on the MUSE mode system clock and the NTSC mode system clock.

In this way, the prior art MUSE-NTSC converter has a disadvantage that it needs at least three PLL circuits, and this makes the circuitry complicated.

Additionally, the prior art MUSE-NTSC converter, after transforming the color difference signals R-Y and B-Y into the analog signals, requires the NTSC chroma encoder 11 in the following stage for processing the analog signals, and therefore, there arises the problem that a scale of the circuitry is to be increased.

SUMMARY OF THE INVENTION

According to the present invention, a MUSE-NTSC converter comprises first oscillating means for producing a first oscillation signal of a first frequency working as a system clock for a MUSE mode signal, second oscillating means for producing a second oscillation signal of a second frequency working as a system clock for an NTSC mode signal, the second frequency being set to an integral multiple of a frequency of a subcarrier of the NTSC mode signal, time-base transforming means receiving the MUSE mode signal and the first and second oscillation signals for transforming the MUSE mode signal on the time-base from the first frequency to the second frequency based upon the first and second oscillation signals to output the NTSC mode signal, signal separating means receiving the second oscillation signal and the NTSC mode signal for varying kinds of signal separation processing depending upon features of the NTSC mode and separating the NTSC mode signal into a luminance signal and a color difference signal, luminance signal processing means receiving the second oscillation signal and the luminance signal for processing the luminance signal based upon the second oscillation signal, chroma encoding means receiving the second oscillation signal and the color difference signal for processing the color difference signal based upon the second oscillation signal, producing the subcarrier from the second oscillation signal, and using the subcarrier to modulate the color difference signal, and a PLL circuit for synchronizing the first and second oscillation signals in phase.

Preferably, the PLL circuit includes a third second oscillating means for producing the oscillation signal, first frequency dividing means for dividing a frequency of the first oscillation signal with a first frequency dividing ratio to output a first frequency divided signal, second frequency dividing means for dividing a frequency of the second oscillation signal with a second frequency dividing ratio to output a second frequency divided signal, and phase comparing means for detecting a phase difference between the first and second frequency divided signals to produce a signal based upon the phase difference as a phase control signal for controlling a phase of the second oscillation signal from the second oscillating means, wherein the second and third oscillating means are same means.

Preferably, the first frequency is 32.4 MHz, the second frequency is 28.63636 MHz, the first frequency dividing ratio is 1/3375, and the second frequency dividing ratio is 1/2983.

Preferably, the first frequency is 32.4 MHz, the second frequency is 28.63636 MHz, the first frequency dividing ratio is 1/180000, and the second frequency dividing ratio is 1/159091.

Preferably, the first frequency is 32.4 MHz, the second frequency is 28.63636 MHz, the first frequency dividing ratio is 1/21600, and the second frequency dividing ratio is 1/19091.

In another aspect of the present invention, a MUSE-NTSC converter comprises first oscillating means for producing a first oscillation signal of a first frequency working as a system clock for a MUSE mode signal, second oscillating means for producing a second oscillation signal of a second frequency working as a system clock for an NTSC mode signal, the second frequency being set to an integral multiple of four times a frequency of a subcarrier of the NTSC mode signal, time-base transforming means receiving the MUSE mode signal and the first and second oscillation signals for transforming the MUSE mode signal on the time-base from the first frequency to the second frequency based upon the first and second oscillation signals to output the NTSC mode signal, signal separating means receiving the second oscillation signal and the NTSC mode signal for separating the NTSC mode signal into a luminance signal and first and second color difference signals out of phase by 90° from each other, luminance signal processing means receiving the second oscillation signal and the luminance signal for processing the luminance signal based upon the second oscillation signal to output the resultant processed luminance signal, digital chroma encoding means receiving the second oscillation signal and the first and second color difference signals for performing digital-basis signal processing to a color difference multiple signal obtained by alternately sampling the first and second color difference signals at a sampling timing of four times as much as the frequency of the subcarrier based upon the second oscillation signal, producing the subcarrier based upon the second oscillation signal, and encoding processing by modulating the subcarrier with the color difference multiple signal to produce a digital chroma signal, first D-A converting means for D-A converting the processed luminance signal processed in the luminance signal processing means to produce the resultant analog luminance signal, and second D-A converting means for D-A converting the digital chroma signal to produce an analog chroma signal.

Preferably, the digital chroma encoding means includes color difference signal multiplying means for alternately sampling the first and second color difference signals at the sampling timing to produce the color difference multiple signal, burst apply means for applying first and second burst data, burst multiplying means for alternately sampling the first and second burst data at the sampling timing to produce a burst multiple signal, burst adding means for adding the burst multiple signal to the color difference multiple signal to produce a burst added color difference multiple signal, and encoding means producing the subcarrier based upon the second oscillation signal for encoding processing by modulating the subcarrier with the burst added color difference multiple signal to produce the digital chroma signal.

Preferably, the digital chroma encoding means includes burst data apply means for applying first and second burst data, burst multiplying means for alternately sampling the first and second burst data at the sampling timing to produce a burst multiple signal, offset data apply means for applying first and second offset data, first adding means for adding the first color difference signal and the first offset data to produce a first offset added color difference signal, second adding means for adding the second color difference signal and the second offset data to produce a second offset added color difference signal, first overflow/underflow modifying means receiving the first offset added color difference signal for modifying the first offset added color difference signal when detecting the overflow or underflow of the first offset added color difference signal, second overflow/underflow modifying means receiving the second offset added color difference signal for modifying the second offset added color difference signal when detecting the overflow or underflow of the second offset added color difference signal, color difference signal multiplying means for sampling the first and second offset added color difference signals at the sampling timing to produce an offset added color difference multiple signal, burst adding means for adding the burst multiple signal to the offset added color difference multiple signal to produce a burst containing color difference multiple signal, and encoding means for producing the subcarrier based upon the second oscillation signal and encoding processing by modulating the subcarrier with the burst containing color difference multiple signal to produce the digital chroma signal.

Preferably, the digital chroma encoding means includes color difference signal multiplying means for alternately sampling the first and second color difference signals at the sampling timing to produce the color difference multiple signal, burst data apply means for applying first and second burst data, burst multiplying means for alternately sampling the first and second burst data at the sampling timing to produce a burst multiple signal, offset data apply means for applying first and second offset data, offset multiplying means for alternately sampling the first and second offset data at the sampling timing to produce an offset multiple signal, adding means for adding the color difference multiple signal and the offset multiple signal to produce an offset added color difference multiple signal, overflow/underflow modifying means receiving the offset added color difference multiple signal for modifying the offset added color difference multiple signal when detecting the overflow or underflow of the offset added color difference multiple signal, burst adding means for adding the burst multiple signal to the offset added color difference multiple signal to produce a burst containing color difference multiple signal, and encoding means for producing the subcarrier based upon the second oscillation signal, encoding processing by modulating the subcarrier with the burst containing color difference multiple signal to produce the digital chroma signal.

Preferably, the digital chroma encoding means includes background data apply means for applying first and second background data, background multiplying means for alternately sampling the first and second background data at the sampling timing to produce a background multiple signal, blanking data apply means for applying blanking data, blanking data adding means for adding the blanking data to the background multiple signal to produce a blanking-background multiple signal, and blanking background adding means for adding the blanking-background multiple signal to the offset added color difference multiple signal.

Preferably, a MUSE-NTSC converter further comprises color difference signal output means receiving the offset added color difference multiple signal to which the blanking-background multiple signal is further added, for separating the offset added color difference multiple signal into first and second color difference signal components to output them to the outside.

Preferably, a MUSE-NTSC converter further comprises coefficient modifying means receiving the offset added color difference multiple signal to which the blanking-background multiple signal is further added, for multiplying at least one of the first and second color difference signal components of the offset added color difference multiple signal by a coefficient to perform coefficient modification between the first and second color difference signal components of the offset added color difference multiple signal.

Preferably, a MUSE-NTSC converter further comprises frame signal apply means for applying a frame signal for designating an NTSC mode frame cycle, the encoding means including subcarrier producing means for producing the subcarrier based upon the second oscillation signal, the subcarrier producing means including means receiving the frame signal for varying a phase between frames of the subcarrier in accordance with a difference of the phase between frames of the NTSC mode signal.

Preferably, a MUSE-NTSC converter further comprises vertical synchronizing signal apply means for applying a vertical synchronizing signal, and NTSC timing signal generating means receiving the vertical synchronizing signal and the second oscillation signal for alternately outputting the vertical synchronizing signal and a delayed vertical synchronizing signal delayed by a specified period of time from the vertical synchronizing signal frame by frame to the outside in accordance with the phase difference between the frames of the NTSC mode signal.

Preferably, a MUSE-NTSC converter further comprises digital bandpass filtering means interposed between the digital chroma encoding means and the D-A converting means and receiving the digital chroma signal for performing the digital-basis bandpass filtering to the digital chroma signal to output the digital chroma signal to the second D-A converting means.

In the MUSE-NTSC converter in the first aspect of the present invention, the second oscillation means produces the second oscillation signal of the second frequency working as a system clock for the NTSC mode signal, and since the second frequency is set to an integral multiple of the frequency of the subcarrier for the NTSC mode signal and any integer, the signal processing means can produce the subcarrier based upon the second oscillation signal.

Since the signal separating means, receiving the second oscillation signal and the NTSC mode signal, varies the kinds of signal separating processing depending upon features of the NTSC and separates the NTSC mode signal into the luminance signal and the color difference signals, only one kind of the system clock, namely, the second oscillation signal, is required regardless of the features of the NTSC mode.

In the MUSE-NTSC converter in the second aspect of the present invention, the second oscillating means produces the second oscillation signal of the second frequency working as a system clock for the NTSC mode signal, and the second frequency is set to an integral multiple of four times the frequency of the subcarrier of the NTSC mode signal and any integer multiplied by four.

Hence, the digital chroma encoding means alternately samples first and second color difference signals at a timing of the frequency four times as much as that of the subcarrier to obtain the color difference multiple signal, so that the chroma signal which is a composite signal of the first and second color difference signals can be easily obtained.

Accordingly, it is an object of the present invention to provide a MUSE-NTSC converter having a relatively simple and small scale circuit configuration.

These and other objects, features, aspects and advantages of the present invention will become more fully apparent from the following detailed description of the present invention when taken in conjunction with the accompanying drawings.

DETAILED DESCRIPTION OF THE PREFERRED EMBODIMENT

<<Embodiment 1>>

Figure 1:
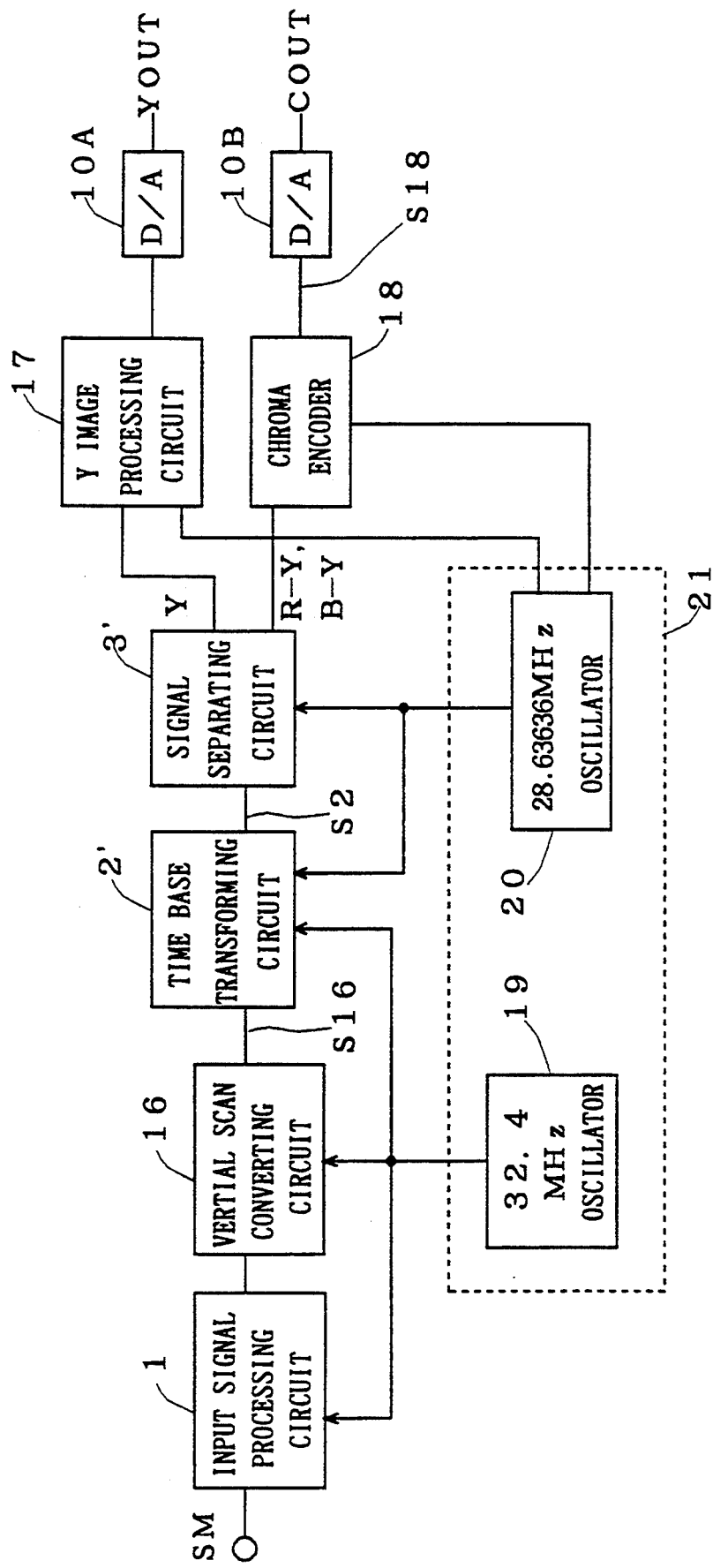
FIG. 1 is a block diagram showing a MUSE-NTSC converter of a first preferred embodiment according to the present invention.

FIG. 1 is a block diagram showing an arrangement of a MUSE-NTSC converter of a first preferred embodiment of the present invention.

In FIG. 1, reference numeral 1 denotes an input signal processing circuit which receives a MUSE signal SM digitized in advance and performs various kinds of processing, such as deemphasis, control signal detection, PLL synchronization for resampling, two-dimensional interpolation of resampled data, and the like, to output the resultant signal to a vertical scanning transforming circuit 16.

The vertical scanning transforming circuit 16 transforms the MUSE signal SM preprocessed in the input signal processing circuit 1 from 1123 vertical scanning lines into 525 lines to output an intermediate signal S16 to a time-base transforming circuit 2'.

The time-base transforming circuit 2' transforms the intermediate signal S16 on the time-base from the MUSE mode into the NTSC mode to output an NTSC signal S2 to a signal separating circuit 3'.

The signal separating circuit 3' receives the NTSC signal S2 and separates it into a luminance signal Y and color difference signals R-Y and B-Y to output the luminance signal Y to a Y image processing circuit 17 and output the color difference signals R-Y and B-Y to a chroma encoder 18. At this time, kinds of processing vary among features (wide mode, full mode and zoom mode) of the NTSC mode.

The Y image processing circuit 17 performs various kinds of processing on the luminance signal Y to the luminance signal Y to output the resultant signal to a D-A converter 10A.

The chroma encoder 18 internally generates a subcarrier based upon an oscillation signal from a 28.63636 MHz oscillator 20 and modulates the color difference signals R-Y and B-Y with the subcarrier after performing various kinds of signal processing on those signals, so as to output an NTSC mode chroma signal S18 to a D-A converter 10B. Since the oscillation signal from the 28.63636 MHz oscillator 20 is of eight times as much as subcarrier frequency fsc, the frequency of the oscillation signal from the 28.63636 MHz oscillator 20 may be divided to obtain the subcarrier frequency fsc. Thus, the chroma encoder 18 can produce the subcarrier based upon the oscillation signal from the 28.63636 MHz oscillator 20.

The D-A converter 10A D-A converts the luminance signal Y processed by the Y image processing circuit 17 and outputs an analog luminance output signal YOUT while the D-A converter 10B D-A converts the chroma signal S18 and outputs an analog chroma output signal COUT.

The input signal processing circuit 1 uses an oscillation signal from a 32.4 MHz oscillator 19 as its system clock, the vertical scanning transforming circuit 16 uses the oscillation signal from the 32.4 MHz oscillator 19 as its system clock, the time-base transforming circuit 2' uses the oscillation signals from the 32.4 MHz oscillator 19 and 28.63636 MHz oscillator 20 as its system clocks, and the signal separating circuit 3', the Y image processing circuit 17 and the chroma encoder 18 use the oscillation signal from the 28.63636 MHz oscillator 20 as their system clocks.

Thus, a PLL circuit 21 is constituted for synchronizing the oscillation signal from the 32.4 MHz oscillator 19 with that from the 28.63636 MHz oscillator 20 in phase.

<Vertical Scanning Transforming Circuit>

Figure 2:
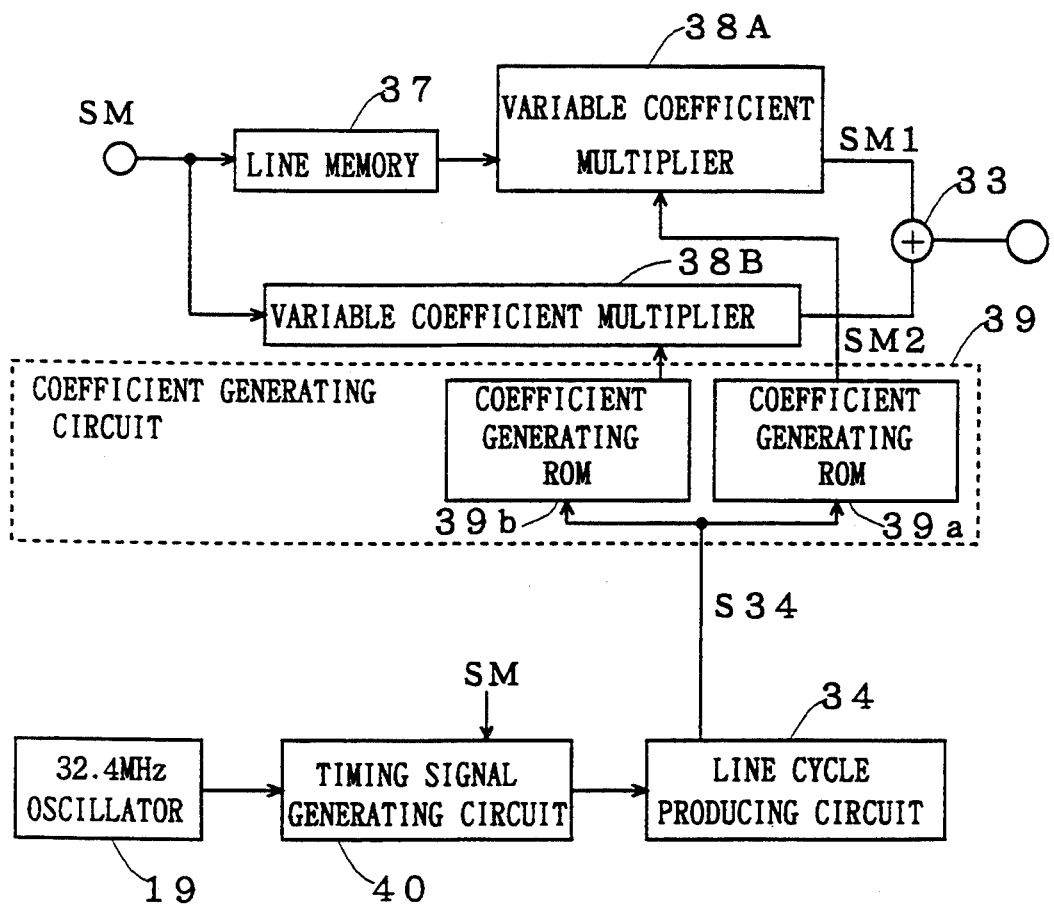
FIG. 2 is a block diagram showing an internal configuration of a vertical scanning transforming circuit in FIG. 1.

FIG. 2 is a circuit diagram showing details of an inner structure of the vertical scanning transforming circuit 16 of FIG. 1. As shown in FIG. 2, the MUSE signal SM is input to a variable coefficient multiplier 38A via a line memory 37 and directly to a variable coefficient multiplier 38B. The line memory 378 causes a single line frequency delay on the MUSE signal to transmit it to a following variable coefficient multiplier 38A.

On the other hand, the oscillation signal from the 32.4 MHz oscillator 19 is applied to a timing signal generating circuit 40. The timing signal generating circuit 40 generates timing signals such as a Synchronizing signal and the like based upon the MUSE signal SM while outputting a control signal to a line cycle producing circuit 34.

The line cycle producing circuit 34 outputs a line cycle signal S34 specifying a line cycle as being 1 to 15 to a coefficient generating circuit 39 based upon the control signal received from the timing signal generating circuit 40. The coefficient generating circuit 39 has a coefficient generating ROM 39a and a coefficient generating ROM 39b inside; the coefficient generating ROMs 39a and 39b respectively output coefficients based upon the line cycle signal S34 to the variable coefficient multipliers 38A and 38B, respectively.

The variable coefficient multipliers 38A and 38B respectively multiply the MUSE signal SM by the coefficients obtained from the coefficient generating ROMs 39a and 39b to output the resultant coefficient multiplied MUSE signals SM1 and SM2 to an adder 33.

There are 1032 effective scanning lines in the MUSE signal, three lines fewer than 1035 lines in a high vision signal for convenience of the transmission. Thus it may be assumed that there are also 1035 effective scanning lines in the MUSE signal, and there are 483 effective scanning lines in the NTSC mode; for both the signals, the effective scanning line ratio is 92%, and the rate of the effective scanning lines is 15 to 7. Thus, reducing the effective scanning lines of the MUSE signal to 7/15 in number, or 483 lines, specifically, making seven lines of fifteen in the MUSE signal, the whole in a vertical direction can be reproduced on an NTSC monitor.

An operation of the vertical scanning transforming circuit 16 will be described below.

The 1035 lines in the MUSE signal SM which has undergone various kinds of signal processing such as the deemphasis, two-dimensional interpolation and the like in the input signal processing circuit 31 in FIG. 1 is input to the vertical scanning transforming circuit 16.

A signal indicating the beginning of the line to be transformed by the timing signal generating circuit 40, or the beginning of picture data is input to the line cycle producing circuit 34. The line cycle producing circuit 34 repeatedly outputs the line cycle signal S34 from 1 to 15 in 15-line cycle from the input signal to the coefficient generating circuit 39. The coefficient generating ROMs 39a and 39b within the coefficient generating circuit 39 output coefficients from 1/7 to 1 (including zero) respectively based upon the line cycle signal S34 to the variable coefficient multipliers 38A and 38B, respectively, as shown in FIG. 4.

The variable coefficient multipliers 38B and 38A receiving the coefficients output to the adder 33 the coefficient multiplied MUSE signals SM2 and SM1 which are obtained by multiple signals a single line delayed from the MUSE signals SM by the coefficients. In this case, although the two variable coefficient multipliers 38A and 38B are structured the same, the multiplier coefficients are different as seen in FIG. 4, and the operational design is made so that the sum of the two coefficients is 1. In FIG. 4, those marked with "A" are the multiplier coefficients used in the operation of the variable coefficient multiplier 38A while those marked with "B" are the multiplier coefficients used in the operation of the variable coefficient multiplier 38B.

Figure 4:
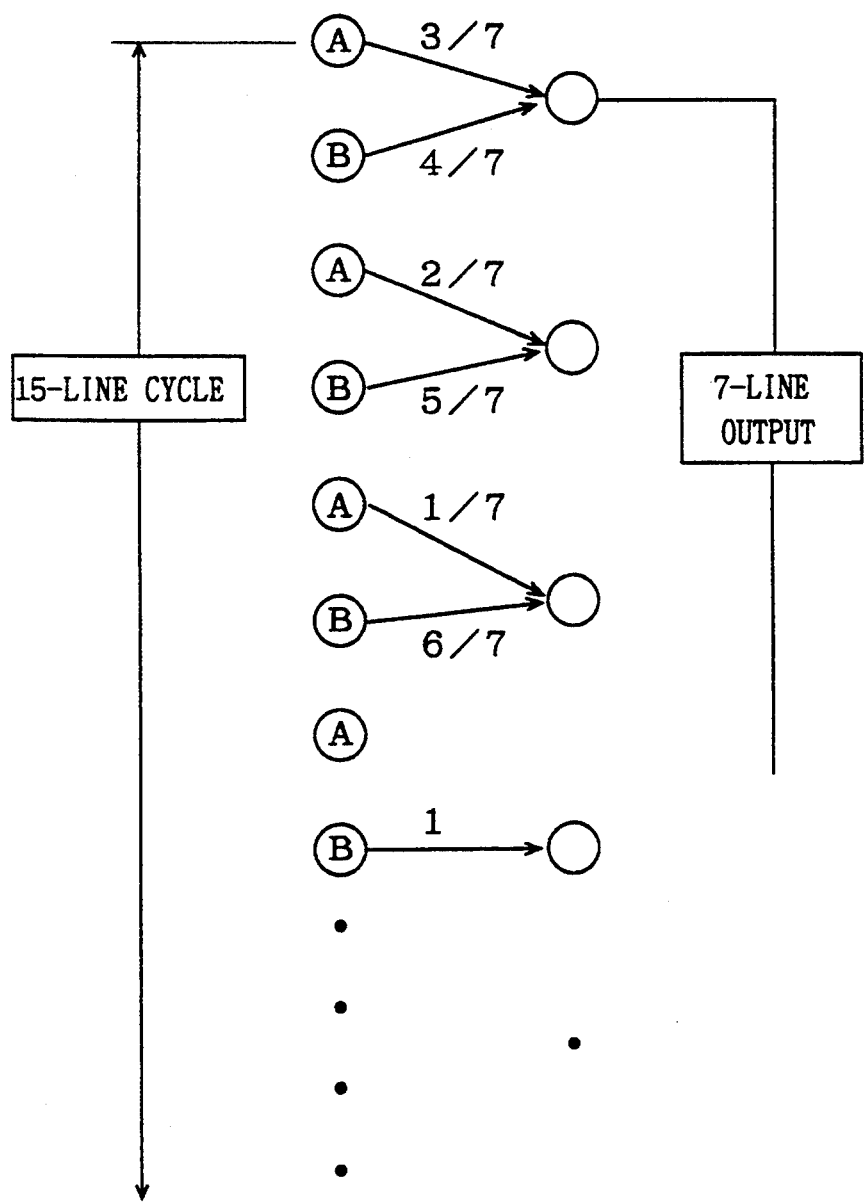
FIG. 4 is a diagram illustrating an operation of the vertical scanning transforming circuit in FIG. 2.

A summation output from the adder 33, as shown in FIG. 4, is selected seven lines out of fifteen lines by a selecting means not shown, and consequently, the intermediate signal S16 obtained by transforming fifteen scanning lines into seven scanning lines is output to the time-base transforming circuit 2'.

Figure 3:
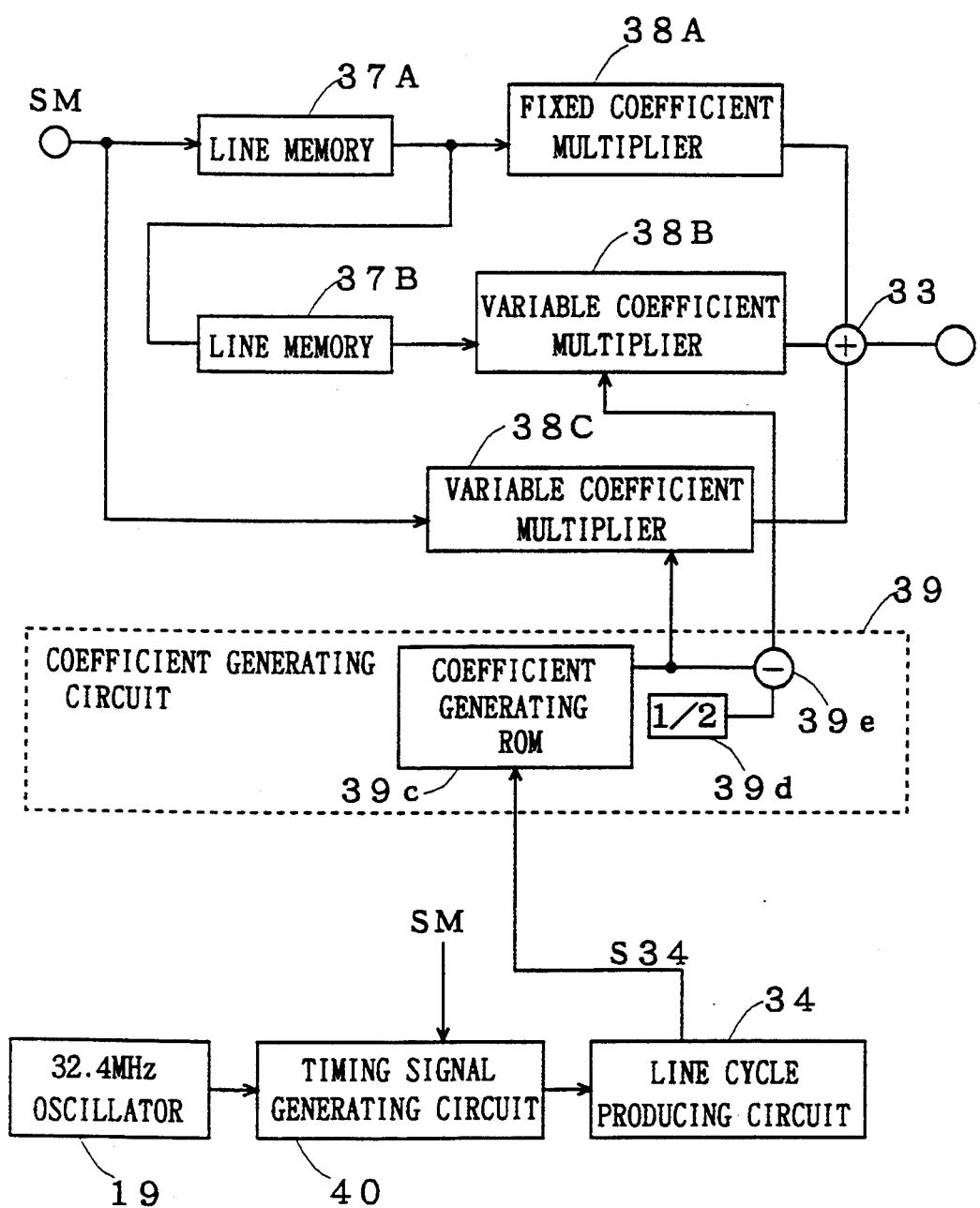
FIG. 3 is a block diagram showing another internal configuration of the vertical scanning transforming circuit in FIG. 1.

FIG. 3 is a block diagram showing another exemplary arrangement of the vertical scanning transforming circuit 16. Herein two of line memories 37 (symbolized by 37A and 37B) are used in serial arrangement, where output of the line memory 37A is input to a fixed coefficient multiplier 38A (coefficient $\frac{1}{2}$) while output of the line memory 37B is input to a-variable coefficient multiplier 38B, and the MUSE signal SM is directly input to a variable coefficient multiplier 38C.

The coefficient generating circuit 39 consists of a coefficient generating ROM 39c, a $\frac{1}{2}$ fixed coefficient generating unit 39d and a subtractor 39e; the coefficient generating ROM 39c outputs a coefficient based upon the line cycle signal S34 to the variable coefficient multiplier 38C and the subtractor 39e, respectively. The subtractor 39e outputs to the variable coefficient multiplier 38B a value subtracting the coefficient from the coefficient generating ROM 39c from the fixed coefficient $\frac{1}{2}$ from the $\frac{1}{2}$ fixed coefficient generating unit 39d. Other components and their arrangement are similar to those shown in FIG. 2, and therefore, the description is omitted.

Figure 5:
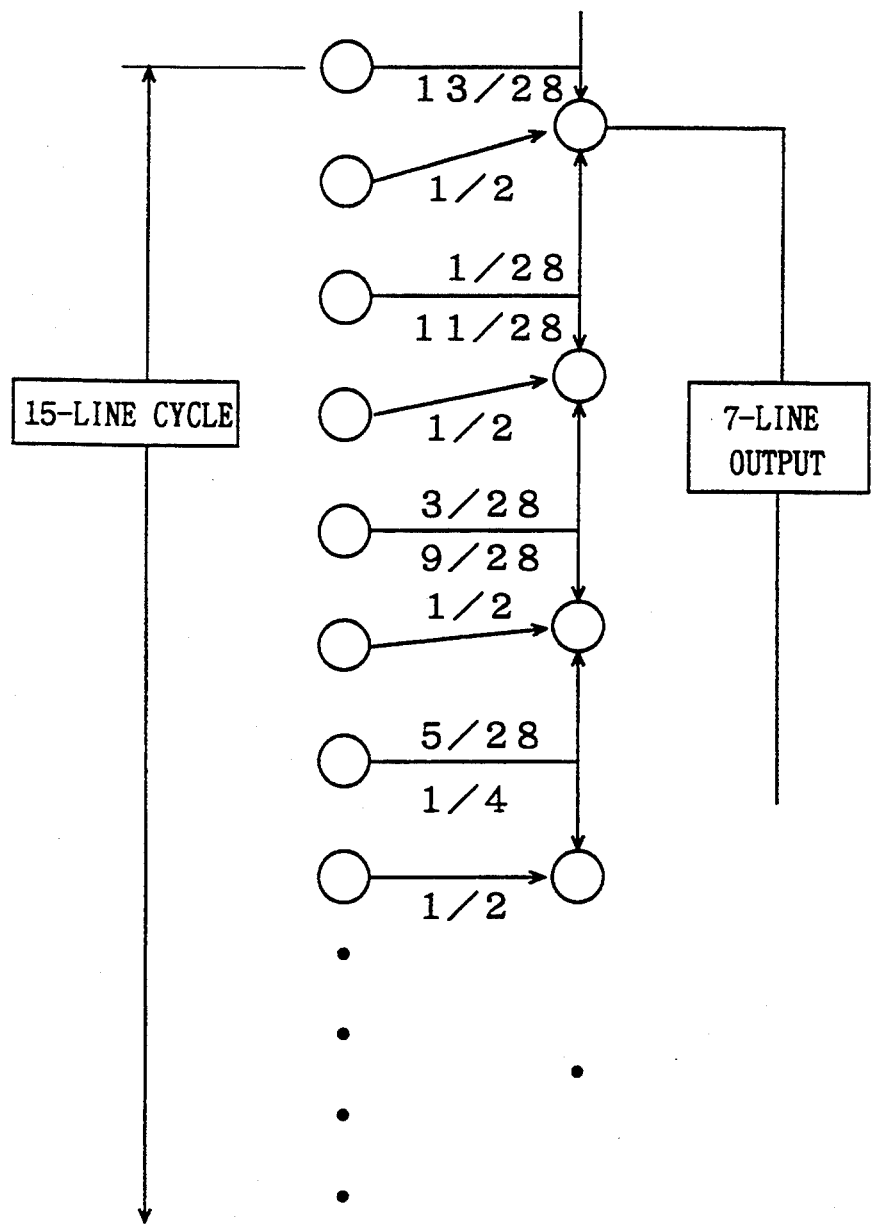
FIG. 5 is a diagram illustrating an operation of the vertical scanning transforming circuit in FIG. 3.

With such arrangement as stated above, a filter characteristic is improved using three line interpolation in producing seven scanning lines out of fifteen. Although a coefficient in this event, for example, varies from 1/28 to 13/28 as shown in a FIG. 5, basically it varies in 15-line cycle.

<Time-Base Transforming Circuit>

Figure 6:
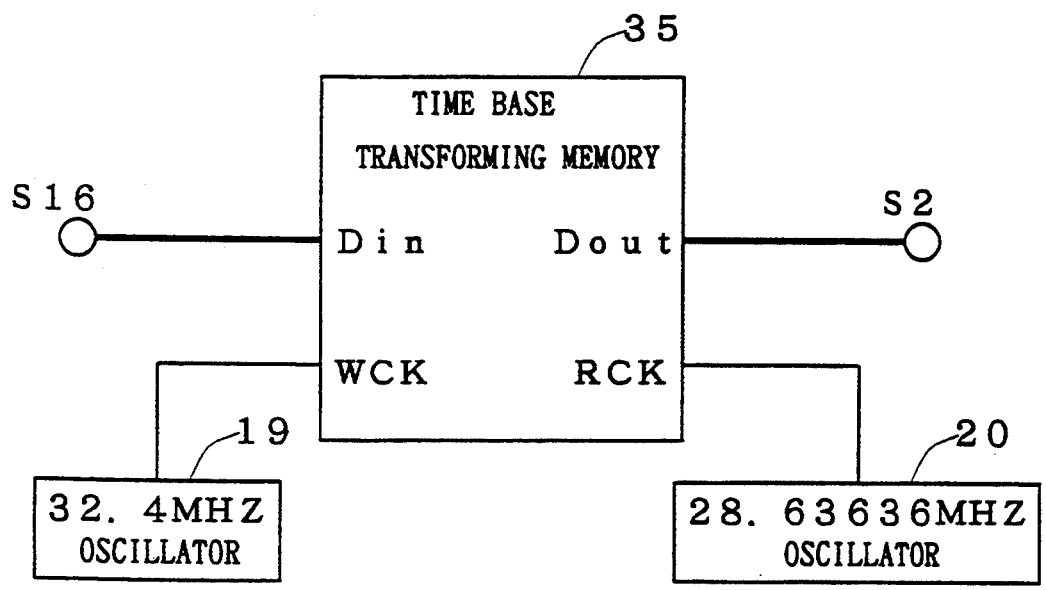
FIG. 6 is a diagram illustrating a peripheral architecture of a time-base transforming memory.

FIG. 6 is a diagram illustrating an arrangement of a time-base transforming memory as a main portion of the time-base transforming circuit 2' in FIG. 1.

As shown in FIG. 6, the intermediate signal S16 from the vertical scanning transforming circuit 16 is received on a data input Din, and the NTSC signal S2 is output on a data output Dout. On this occasion, the oscillation signal from the 32.4 MHz oscillator 19 is received on a writing clock WCK, and the oscillation signal from the 28.63636 MHz oscillator 20 is received on a reading clock RCK.

A system clock of eight times as large as the subcarrier (referred to as "fsc" hereinafter) of the chroma of the NTSC is selected, and therefore, read with an 8 fsc (28.63636 MHz) clock is needed to read data (the intermediate signal S16) written in the time-base transforming memory 35 in 32.4 MHz, as shown in FIG. 6.

<Signal Separating Circuit>

Figure 7:
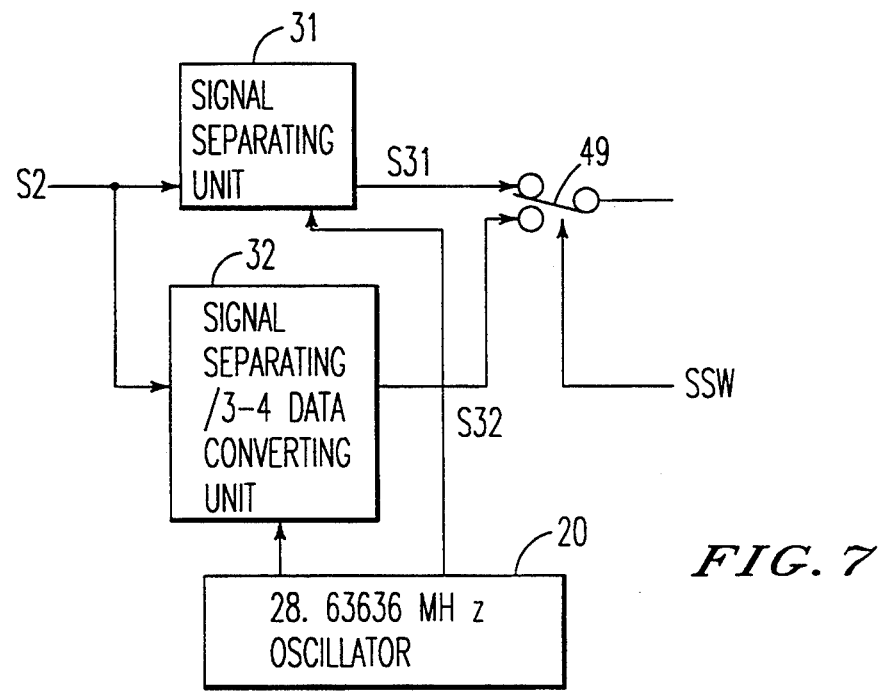
FIG. 7 is a block diagram showing an internal configuration of a signal separating circuit in FIG. 1.

FIG. 7 is a block diagram showing an inner structure of a signal separating circuit 3' shown in FIG. 3. As shown in FIG. 7, the signal separating circuit 3' consists of a signal separating unit 31, a signal separating/3-4 data transforming unit 32 and a selector 49.

The signal separating unit 31 receives the NTSC signal S2 and outputs to first one of inputs of a selector 49 a separated signal S31 which separately contains a luminance signal Y and color difference signals R-Y and B-Y separated from the NTSC signal S2.

The signal separating/3-4 data transforming unit 32, similar to the signal separating unit 31, separates the NTSC signal S2 into the luminance signal Y and the color difference signals R-Y and B-Y, and it further outputs to second one of the inputs of the selector 49 a transformed separated signal S32 which is produced by making four data of three data in either of those signals and then transforming them. Both the separated signal S31 and the transformed separated signal S32 are the signals independently separated into the luminance signal Y and the chroma difference signals R-Y and B-Y similar to the output from the signal separating circuit 3' in FIG. 1, and in FIG. 7, for convenience, they are depicted as united signals (S31, S32), respectively. The signal separating unit 31 and the signal separating/3-4 data transforming unit 32 receive the oscillation signal from the 28.63636 MHz oscillator 20 as their respective system clocks.

The selector 49 receives a mode switch signal SSW for designating an NTSC converting mode from a mode switching signal apply means not shown and selects the separated signal S31 in the event that the mode switch signal designates the full mode or the wide mode (referred to as "full wide mode" hereinafter) or selects the transformed separated signal S32 in the event of designating the zoom mode, to transmit either one of those selected signals to the Y image processing circuit 17 and the chroma encoder 18 (see FIG. 1).

As to the prior art MUSE-NTSC converter, switching the full wide mode to the zoom mode is implemented by changing a system clock after the time-base transformation.

Figure 8:
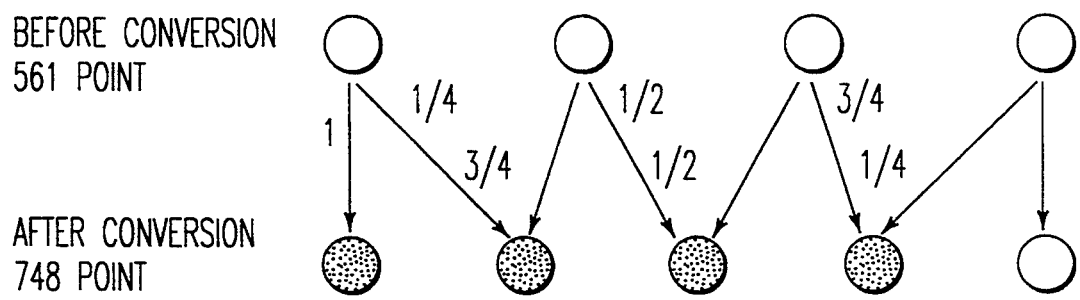
FIG. 8 is a diagram illustrating an operation of the signal separating circuit in FIG. 7.

However, the signal separating circuit 3' of the first preferred embodiment changes kinds of its signal separating processing depending upon the full wide mode or the zoom mode; especially in the zoom mode, as shown in FIG. 8, linear interpolation in adjacent several points enables three data to be reproduced in four data, and magnification in the horizontal direction in the zoom mode also allows the oscillation signal from the 28.63636 MHz to be a unity. An operation of this circuit will now be described.

When the mode switch signal SSW designates the full wide mode, the separated signal S31, which results from separation of the NTSC signal S2 into the luminance signal Y and the color difference signals R-Y and B-Y by the signal separating unit 31, is selected by the selector 49 and transmitted to a following circuit.

On the other hand, when the mode switch signal SSW designates the zoom mode, the NTSC signal S2 is separated into the luminance signal Y and the color difference signals R-Y and B-Y by the signal separating-/3-4 data transforming unit 32, and additionally, as to the luminance signal Y, for example as shown in FIG. 8, linear interpolation enables 561-point data of the NTSC signal S2 read from the time-base transforming circuit 2' to be reproduced in 748-point data. This is because the NTSC signal S2 must be 4/3 times in the horizontal direction in the zoom mode to retain roundness ratio.

Reasons of this will be briefly described below. In the full wide mode, the number of effective scanning lines of the NTSC signal S2 is transformed to 483 lines or the number of the effective scanning lines in the NTSC mode, and hence, the roundness ratio can be retained when displayed on a monitor with 16:9 aspect ratio in the NTSC mode. Thus, the signal separating circuit 3' may simply separate the NTSC signal S2 into the luminance signal Y and the color difference signals R-Y and B-Y in the full wide mode.

On the other hand, in the zoom mode, a screen of picture based upon the NTSC signal S2 is cut from the opposite ends of the screen by $\frac{1}{4}$, and the center portion is displayed on a monitor of 4:3 (12:9) aspect ratio. In this case, since the system clock for the signal separating circuit 3' is unified, an additional number of pixels in one horizontal period must be needed corresponding to the portion cut from the opposite ends of the screen. Thus, the signal separating circuit 3' transforms the number of the pixels from three points to four points to increase the NTSC signal S2 4/3 times.

In this way, the separated signal S31 from the signal separating unit 31 and the transformed separated signal S32 from the signal separating/3–4 data transforming unit 32 are switched from mode to mode, so that the signal separating circuit 3' can operate with a single clock (the oscillation signal from the 28.63636 MHz oscillator 20).

<PLL Circuit (in General)>

The oscillation signal from the 28.63636 MHz oscillator 20 equals a product of the subcarrier frequency fsc and an integer (octupled), and therefore, the Y image processing circuit 17 and the chroma encoder 18 perform processing such as frequency division of the oscillation signal from the 28.63636 MHz so as to produce a subcarrier frequency. Thus, the Y image processing circuit 17 and the chroma encoder 18 may employ the oscillation signal form the 28.63636 MHz oscillator 20 as their respective system clocks.

As has been stated above, the signal separating circuit 3' receives the oscillation signal from the 28.63636 MHz oscillator 20 as a single system clock to output the luminance signal Y and the color difference signals R-Y and B-Y for the full wide mode, and the luminance signal Y and the color difference signals R-Y and B-Y for the zoom mode, separately.

In consequence, the oscillator for system clocks in the MUSE-NTSC converter may include only two kinds, that is, the MUSE mode 32.4 MHz oscillator 19 and the NTSC mode 28.63636 MHz oscillator 20, in performing PLL on the system clocks in either the MUSE mode or the NTSC mode, and therefore, the required PLL circuit may be the PLL circuit 21 alone which synchronizes the oscillation signal from the 32.4 MHz oscillator 19 with the oscillation signal from the 28.63636 MHz oscillator in phase.

Thus, the reduced number of the required PLL circuits, compared with the prior art embodiments, accordingly brings about a simple circuit configuration of the resultant MUSE-NTSC converter.

<PLL Circuit (Sample 1)>

Figure 9:
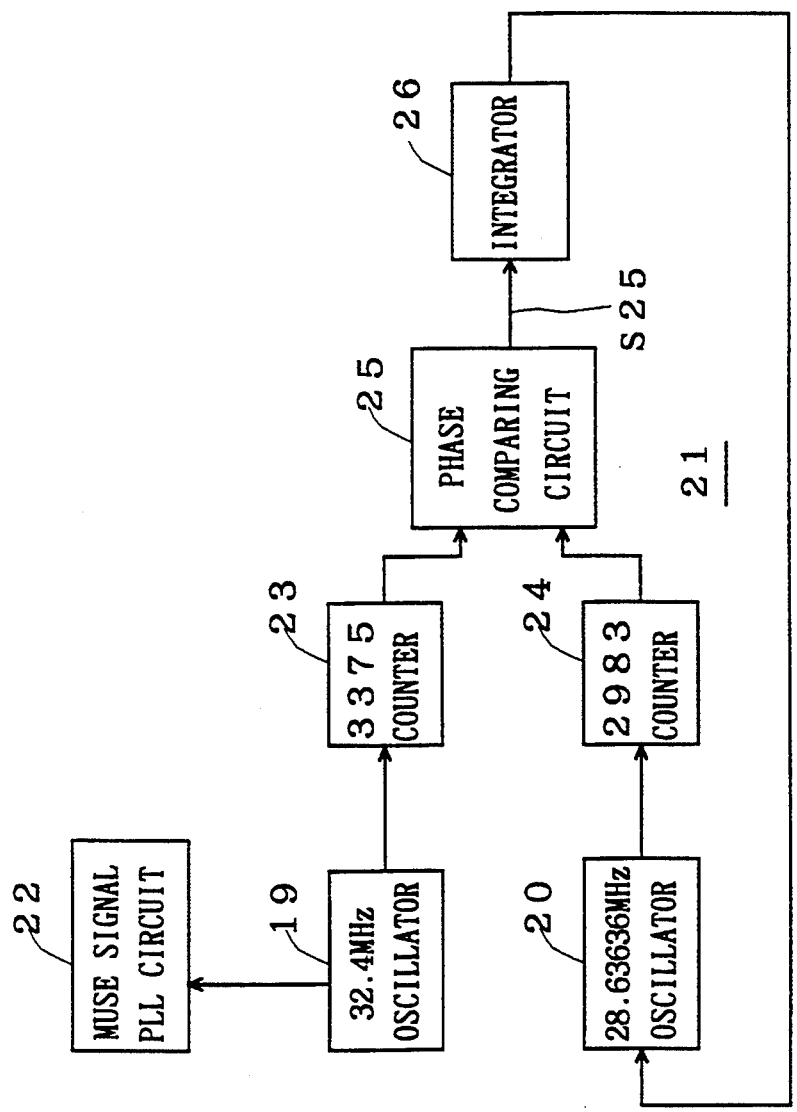
FIG. 9 is a block diagram showing a first exemplary configuration of a PLL circuit in FIG. 1.

FIG. 9 is a block diagram showing a first exemplary arrangement of the PLL circuit 21 shown in FIG. 1. As shown in FIG. 9, the oscillation signal from the 32.4 MHz is output to a 3375 counter 23 while the oscillation signal from the 28.63636 MHz oscillator 20 is output to a 2983 counter 24.

The 3375 counter 23 divides the frequency of the oscillation signal from the 32.4 MHz oscillator 19 to 1/3375 to output the resultant signal to one of inputs of a phase comparing circuit 25 while the 2983 counter 24 divides the frequency of the oscillation signal from the 28.63636 MHz oscillator 20 to 1/2983 to output the resultant signal to the other input of the phase comparing circuit 25.

The phase comparing circuit 25 compares a phase difference of the signals received on both of its inputs to output a resultant phase compared signal S25 to an integrator 26. The integrator 26 outputs a signal obtained by integrating the phase compared signal S25 for phase control to the 28.63636 MHz oscillator 20.

In this way, the 28.63636 MHz oscillator 20, 2983 counter 24, phase comparing circuit 25 and integrator 26 together constitute a loop.

Thus, a phase difference between a signal resulting from the 3375 counter 23 counting the 32.4 MHz oscillation signal 3375 times and a signal resulting from the 2983 counter 24 counting the 28.63636 MHz oscillation signal 2983 times is detected by the phase comparing circuit 25 and then output as a phase control signal for the 28.63636 MHz oscillator 20 via the integrator 26 to the 28.63636 MHz oscillator 20, so that the PLL circuit can be implemented which synchronizes the oscillation signal from the 32.4 MHz oscillator 20 with the oscillation signal from the 28.63636 MHz oscillator 20 in phase.

In this exemplary arrangement, since the frequency of the oscillation signal from the 32.4 MHz oscillator 19 and the frequency of the oscillation signal from the 28.63636 MHz oscillator 20 are divided at the rate 3375: 2983, the greatest common measure frequency of the signals of which frequencies are respectively divided by the 3375 counter 23 and the 2983 counter 24 becomes 9600 Hz, and subcarrier frequency fsc' produced based upon the greatest common measure becomes 3.579600; thus, an error between 3..579600 or the produced subcarrier frequency fsc' and 3.57954 MHz or the actually required subcarrier frequency fsc becomes 54.7 Hz.

Thus, the greatest common measure frequency 9600 Hz is three times as large as the vertical scan frequency 60 Hz or over, and it works to synchronize the frequency divided signals three times or more during the vertical scan. The error between the produced subcarrier frequency fsc' and the actual subcarrier frequency fsc is 54.7 Hz which is approximately 10% (about 50 Hz) or under of the drawn frequency of the chroma, and thus, the PLL circuit 21 which interferes with none of other operations can be formed.

<PLL Circuit (Sample 2)>

Figure 10:
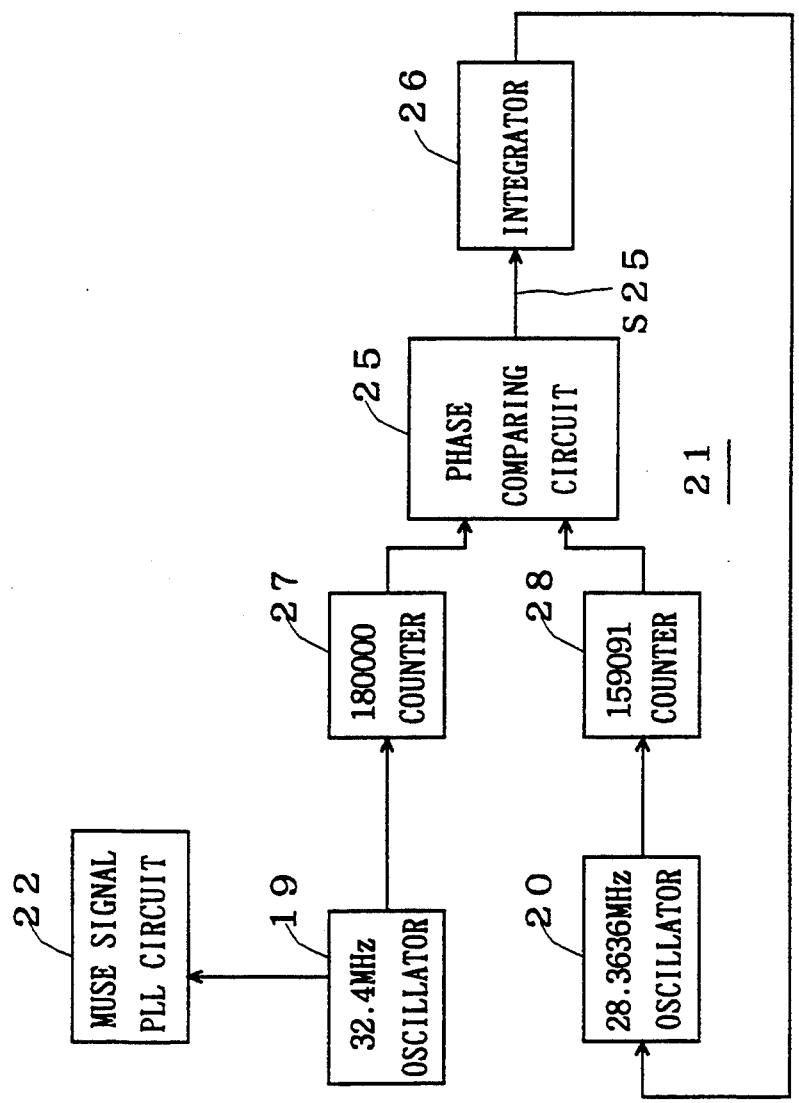
FIG. 10 is a block diagram showing a second exemplary configuration of the PLL circuit in FIG. 1.

FIG. 10 is a block diagram showing a second exemplary arrangement of the PLL circuit 21 shown in FIG. 1. As shown in FIG. 10, the oscillation signal from the 32.4 MHz oscillator 19 is output to a 180000 counter 27 while the oscillation signal from the 28.63636 MHz oscillator 20 is output to a 159091 counter 28.

The 180000 counter 27 divides the frequency of the oscillation signal form the 32.4 MHz oscillator 19 to 1/180000 to output a resultant signal to first one of inputs of the phase comparing circuit 25 while the 159091 counter 28 divides the frequency of the oscillation signal from the 28.63636 MHz oscillator 20 to 1/159091 to output a resultant signal to the other input of the phase comparing circuit 25.

The phase comparing circuit 25 compares the phase difference between the signals received on the both of its inputs to output the phase compared signal S25 to the integrator 26. The integrator 26 integrates the phase compared signal S25 to output the resultant signal for phase control to the 28.63636 MHz oscillator 20.

In this way, the 28.63636 MHz oscillator 20, 159091 counter 28, phase comparing circuit 25 and integrator 26 together constitute a loop.

Thus, a phase difference between a signal resulting from the 180000 counter 27 counting the 32.4 MHz oscillation signal 180000 times and a signal resulting from the 159091 counter 28 counting the 28.63636 MHz oscillation signal 159091 times is detected by the phase comparing circuit 25 and output as a phase control signal for the 28.63636 MHz oscillator 20 via the integrator 26 to the 28.63636 MHz oscillator 20, so that the PLL circuit can be implemented which synchronizes the oscillation signal from the 32.4 MHz oscillator 19 with the oscillation signal from the 28.63636 oscillator 20 in phase.

In this second exemplary arrangement, since the frequency of the oscillation signal from the 32.4 MHz oscillator 19 and the frequency of the oscillation signal form the 28.63636 MHz oscillator 20 are divided at the rate 180000: 159091, the greatest common measure frequency of the signals of which frequencies are divided by the 180000 counter 27 and the 159091 counter 28 is 180 Hz, and the subcarrier frequency fsc' produced based upon the greatest common measure frequency is 3.5795475 MHz; thus, an error between the produced subcarrier frequency fsc' or 3.5795475 MHz and an actually required subcarrier frequency fsc or 3.579545 is 2.2 Hz.

Thus, the greatest common measure frequency is three times as large as the vertical scan frequency 60 Hz, and it is sufficient to synchronize the frequency divided signals three times during the vertical scan. The error between the produced subcarrier frequency fsc' and the actual subcarrier frequency fsc is 2.2 Hz which is 10% or under of the drawn frequency of the chroma, and therefore, the PLL circuit 21 which interferes with none of other operations can be formed.

<PLL Circuit (Sample 3)>

Figure 11:
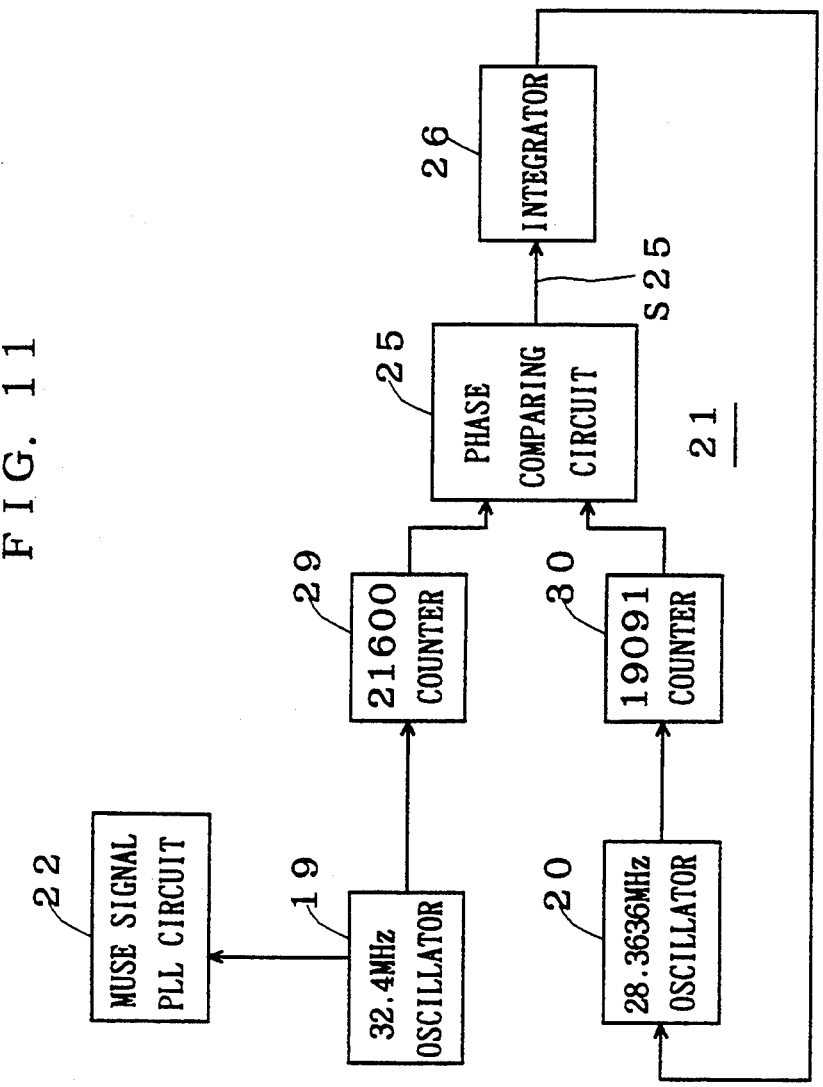
FIG. 11 is a block diagram showing a third exemplary configuration of the PLL circuit in FIG. 3.

FIG. 11 is a block diagram showing a third exemplary arrangement of the PLL circuit 21 shown in FIG. 1. As shown in FIG. 11, the oscillation signal from the 32.4 MHz oscillator 19 is output to a 21600 counter 29 while the oscillation signal from the 28.63636 MHz oscillator 20 is output to a 19091 counter 30.

The 21600 counter 29 divides the frequency of the oscillation signal from the 32.4 MHz oscillator 19 to 1/21600 to output the resultant signal to one of inputs of the phase comparing circuit 25 while the 19091 counter 30 divides the frequency of the oscillation signal from the 28.63636 MHz oscillator 20 to output the resultant signal to the other input of the phase comparing circuit 25.

The phase comparing circuit 25 compares a phase difference between the signals receive on both of its inputs to output a phase compared signal S25 to an integrator 26. The integrator 26 integrates the phase compared signal S25 and outputs the resultant signal for phase control to the 28.63636 MHz oscillator 20.

In this way, the 28.63636 MHz oscillator 20, 19091 counter 30, phase comparing circuit 25 and integrator 26 together constitute a loop.

Thus, a phase difference between a signal resulting from the 21600 counter 29 counting the 32.4 MHz oscillation signal 21600 times and a signal resulting from the 19091 counter 30 counting the 28.63636 MHz oscillation signal 19091 times is detected by the phase comparing circuit 25 and then output as a phase control signal for the 28.63636 MHz oscillator 20 via the integrator 26 to the 28.63636 MHz oscillator 20, so that the PLL circuit which synchronizes the oscillation signal from the 32.4 MHz oscillator 19 with the oscillation signal from the 28.63636 MHz oscillator 20 in phase.

In the third exemplary arrangement, since the frequency of the oscillation signal from the 32.4 MHz oscillator 19 and the frequency of the oscillation signal from the 28.63636 MHz oscillator 20 are divided at the rate of 21600: 19091, the greatest common measure frequency of the frequency divided signals by the 21600 counter 29 and the 19091 counter 30 is 1500 Hz, and a subcarrier frequency fsc' produced based upon the greatest common measure frequency is 3.5795625 MHz; thus, an error between the produced subcarrier frequency fsc' or 3.5795625 MHz and the actually required subcarrier frequency fsc or 3.579545 MHz is 17.2 Hz.

Thus, the greatest common measure frequency 1500 Hz is three times as much as the vertical scan frequency 60 Hz, and it is sufficient to synchronize the frequency divided signals three times or more during the vertical scan. The error between the produced subcarrier frequency fsc' and the actual subcarrier frequency fsc is 17.2 Hz which is 10% or under of the drawn frequency of the chroma, so that the PLL circuit 21 which interferes with none of other operations can be formed.

<<Embodiment 2>>

Figure 12:
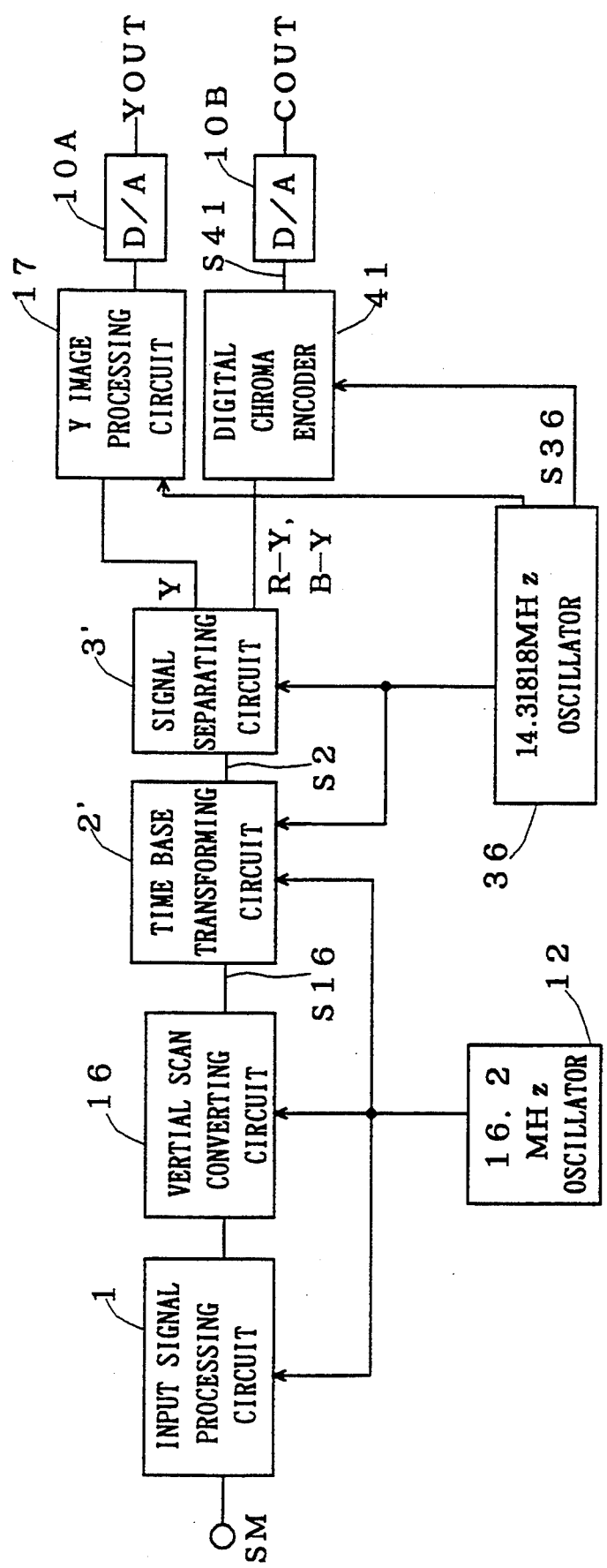
FIG. 12 is a block diagram showing a MUSE-NTSC converter of a second preferred embodiment according to the present invention.

FIG. 12 is a block diagram showing an arrangement of a MUSE-NTSC converter of a second preferred embodiment of the present invention.

In FIG. 12, reference numeral 1 denotes an input signal processing circuit receiving a MUSE signal SM digitized in advance and performs various kinds of processing, such as deemphasis, control signal detection, PLL synchronization for resampling, two-dimensional interpolation of resampled data, and the like, to output the resultant signal to a vertical scanning transforming circuit 16.

The vertical scanning transforming circuit 16 transforms the MUSE signal SM preprocessed in the input signal processing circuit 1 from 1125 vertical scanning lines into 525 lines for the NTSC mode to output an intermediate signal S16 to a time-base transforming circuit 2'.

The time-base transforming circuit 2' transforms the intermediate signal S16 on the time-base from the MUSE mode into the NTSC mode to output an NTSC signal S2 to a signal separating circuit 3'.

The signal separating circuit 3' receives the NTSC signal S2 and separates it into a luminance signal Y and color difference signals R-Y and B-Y to apply the luminance signal Y to a Y image processing circuit 17 and output the color signals R-Y and B-Y to a digital chroma encoder 41. At this time, similar to the first preferred embodiment, kinds of processing vary from the full wide mode to the zoom mode so as to make a single system clock (an oscillation signal from a 14.31818 MHz oscillator 36) compatible between both the modes.

The Y image processing circuit 17 performs various kinds of processing on the luminance signal Y to apply the resultant signal to a D-A converter 10A.

The digital chroma encoder 41 alternately samples the color difference signals R-Y and B-Y every 1/14.31818 μS and performs various kinds of signal processing on the color difference signals R-Y and B-Y, and thereafter, it produces a subcarrier based upon an oscillation signal S36 from a 14.31616 MHz oscillator 36, uses the color difference signals R-Y and B-Y to modulate the subcarrier, and produces the NTSC digital chroma signal S41 to apply it to a D-A converter 10B.

The D-A converter 10A D-A converts the luminance signal Y processed in the Y image processing circuit 17 to output a luminance output signal YOUT while the D-A converter 10B D-A converts the digital chroma signal S41 to output an analog chroma output signal COUT.

The input signal processing circuit 1 employs an oscillation signal from a 16.2 MHz oscillator 12 as its system clock, the vertical scanning transforming circuit 16 employs the oscillation signal from the 16.2 MHz oscillator 12 as its system clock, a time-base transforming circuit 2' employs the oscillation signal from the 16.2 MHz oscillator 12 and the oscillation signal from the 14.31818 MHz oscillator 36 as its system clocks, the signal separating circuit 3', Y image processing circuit 17 and digital chroma encoder 41 employ the oscillation signal from the 14.31818 MHz oscillator 36 as their respective system clocks.

As shown in FIG. 12, the digital chroma encoder 41 employs the oscillation signal from the 14.31818 MHz oscillator 36 as its system clock. The frequency of the oscillation signal is 14.31818 MHz, or four times as large as the subcarrier frequency fsc.

<Digital Chroma Encoder (Theory)>

Figure 13:
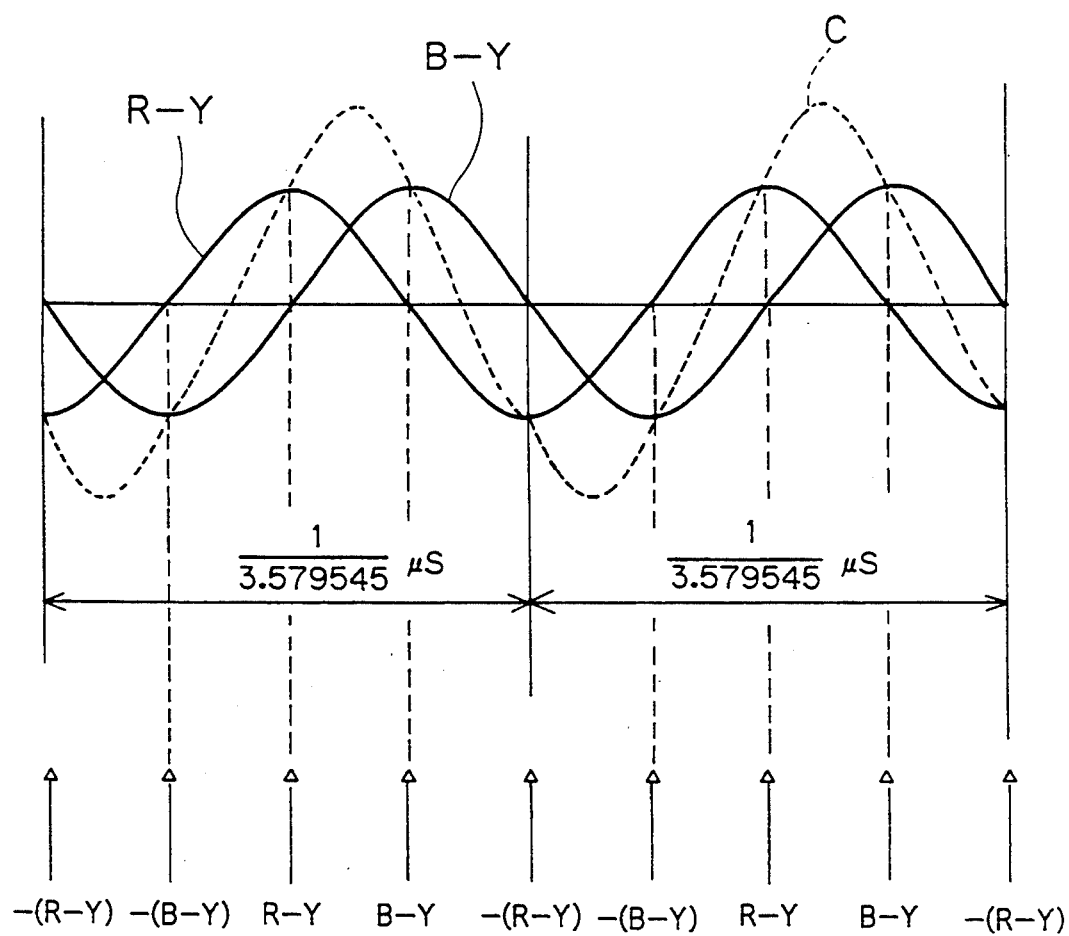
FIG. 13 is a waveform diagram illustrating the operation theory of a digital chroma encoder shown in FIG. 12.

FIG. 13 is a waveform diagram showing the sampling of the color difference signals R-Y and B-Y by the digital chroma encoder 41. As shown in FIG. 13, the color difference signals R-Y and B-Y are out of phase by 90° from each other.

Thus, alternately sampling the color difference signals R-Y and B-Y at a timing represented by arrows in FIG. 13 (with frequency of 14.31818 MHz) facilitates production of a chroma signal C which is a composite signal of the color difference signals R-Y and B-Y.

In this way, employing the oscillation signal S36 having a frequency four times as large as the subcarrier frequency fsc from the 14.31818 MHz as a system clock, a chroma encoder can be comprised of digital circuits, and thus, the desired MUSE-NTSC converter can be obtained with a small scale circuit design.

<NTSC Timing Signal Generating Circuit (Sample 1)>

Figure 26:
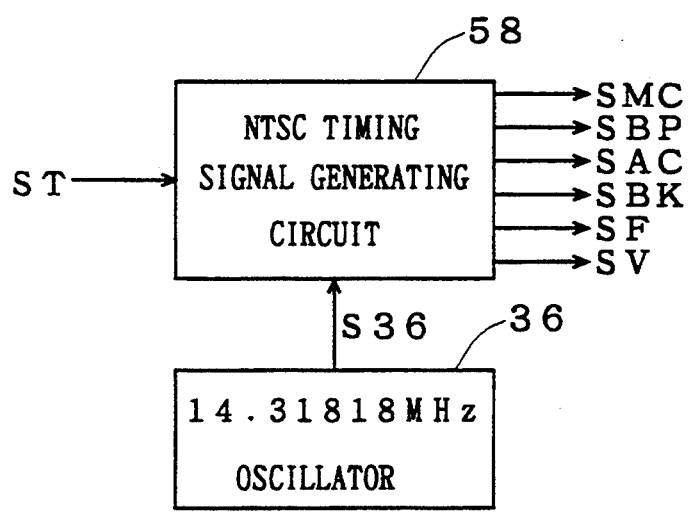
FIG. 26 is a block diagram showing a configuration of an NTSC timing signal generating circuit (Sample 1)

FIG. 26 is a block diagram showing an arrangement of an NTSC timing signal generating circuit. As shown in FIG. 26, an NTSC timing signal generating circuit 58 receives a trigger signal ST from the MUSE signal SM and the oscillation signal S36 from the 14.31818 MHz oscillator 36. The trigger signal ST is a timing signal representing a frame start point in the MUSE mode signal.

The NTSC timing signal generating circuit 58 produces various timing signals, such as a multiple control signal SMC indicating timings of taking the color difference signals R-Y and B-Y, a burst position signal SBP indicating a timing of inserting burst data, an area switch signal SAC, a blanking signal SBK, a frame signal SF, a vertical synchronizing signal SV and the like, based upon the trigger signal ST and the oscillation signal S36. These timing signals will be described later.

<Digital Chroma Encoder (First Exemplary Arrangement)>

Figure 14:
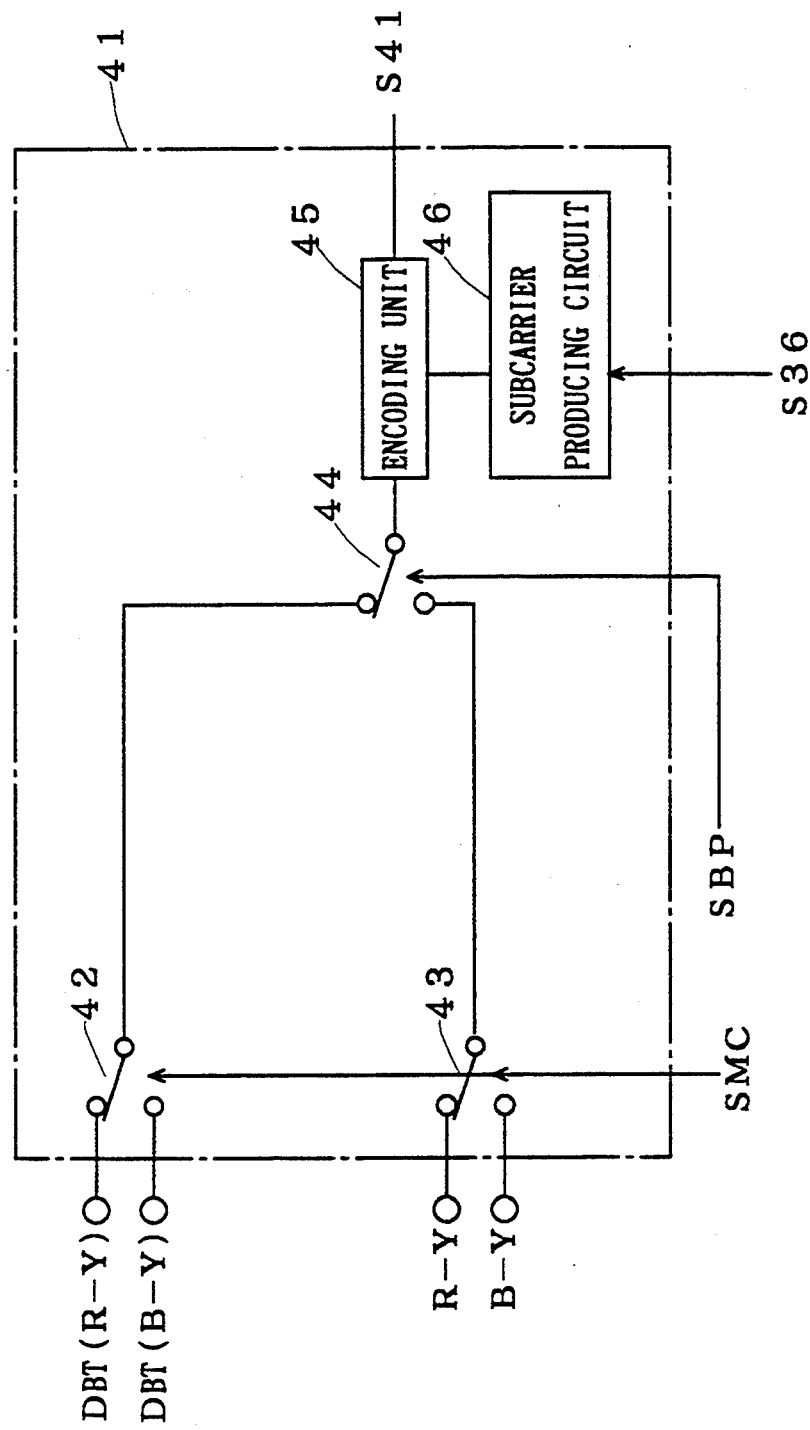
FIG. 14 is a block diagram showing a first exemplary configuration of the digital chroma encoder in FIG. 12.

FIG. 14 is a block diagram showing a first exemplary arrangement of the digital chroma encoder 41. As shown in FIG. 14, R-Y burst data DBT(R-Y) is applied to one of inputs of a selector 42 while B-Y burst data DBT(B-Y) is applied to the other input. The R-Y burst data DBT(R-Y) and B-Y burst data DBT(B-Y) are applied by a burst data applying means not shown. DBT(B-Y) is an externally controllable digital data of several bits, and because of this feature "externally controllable, chrominance phase and chrominance gain are variable. The DBT(R-Y) is usually kept "0".

On the other hand, the color difference signal R-Y is applied to first one of inputs of a selector 43 while the color difference signal B-Y is applied to second one of the inputs.

The selector 42 and the selector 43 are respectively controlled in their respective switching operations in accordance with the multiple control signal SMC. The multiple control signal SMC alternately designates connections to first and second ones of inputs of each of the selectors 42 and 43 at a timing of frequency 14.31818 MHz.

Outputs of the selectors 42 and 43 are connected to one and the other of inputs of a selector 44, respectively.

The selector 44 is controlled in the switching based upon the burst position signal SBP. The burst position signal SBP designates connection to one of inputs of the selector 44 at a timing designating a burst position while it designates connection to the other input of the selector 44 at a timing other than the above.

Output from the selector 44 is transmitted to an encoding unit 45. The encoding unit 45 receives a subcarrier from a subcarrier producing circuit 46 and modulates the subcarrier based upon a signal derived from the output of the selector 44 to output a digital chroma signal S41.

The subcarrier producing circuit 46 divides the frequency of the oscillation signal S36 from the 14.31818 MHz oscillator 36 into ¼ and produces a signal having the subcarrier frequency fsc to produce a subcarrier based upon this signal.

In such an exemplary arrangement, under the control of the multiple control signal SMC, a color difference multiple signal of the color difference signals R-Y and B-Y is obtained from the output of the selector 43 while a burst multiple signal of the R-Y burst data DBT(R-Y) and B-Y burst data DBT(B-Y) is obtained from the output of the selector 42.

Moreover, under the control of the burst position signal SBP, a burst added color difference multiple signal, which is made of the burst multiple signal and the color difference multiple signal added thereto, is obtained from the output of the selector 44.

The encoding unit 45 performs balanced modulation of the subcarrier from the subcarrier producing circuit 46 using the burst added chrominance differential multiple signal obtained from the output of the selector 44 and thus produces the digital chroma signal S41 to output it to the following D/A converter 10B. The color difference signal R-Y is a signal of which burst is out of phase by 180° from that of the color difference signal B-Y. In order to continually keep the burst and phase of each of the color difference signals B-Y and R-Y, there is provided digital data by which polarities can be externally controlled so as to give "0" to the R-Y burst data DBT(R-Y) and the polarity opposite to that of the color difference signal R-Y to the B-Y burst data DBT(B-Y).

<Digital Chroma Encoder (Second Exemplary Arrangement)>

Figure 15:
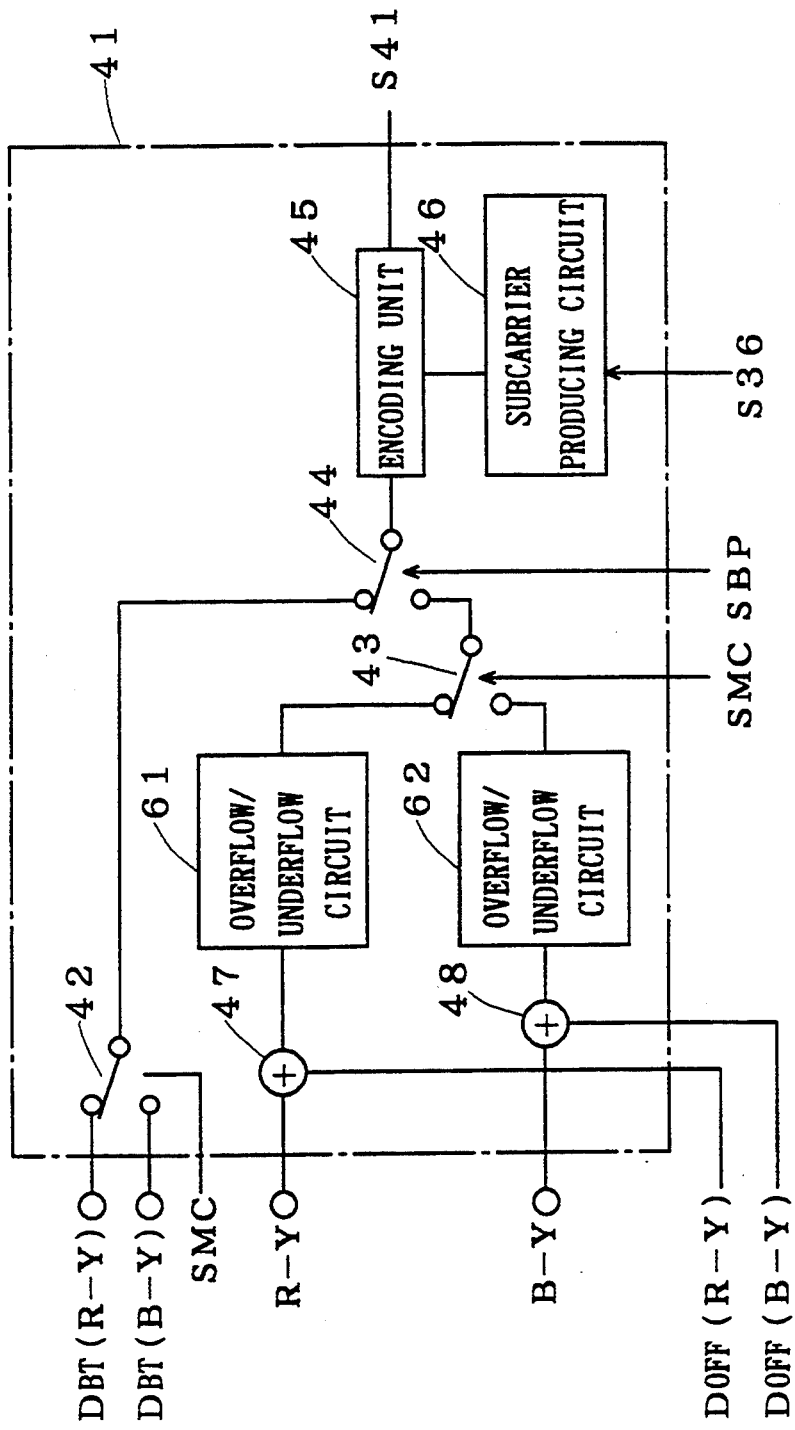
FIG. 15 is a block diagram showing a second exemplary configuration of the digital chroma encoder in FIG. 12.

FIG. 15 is a block diagram showing a second exemplary arrangement of the digital chroma encoder 41. As shown in FIG. 15, the R-Y burst data DBT(R-Y) is applied to one of the inputs of the selector 42 while the B-Y burst data DBT(B-Y) is applied to the other input.

An adder 47 receives the color difference signal R-Y on one of inputs and R-Y offset data DOFF(R-Y) on the other input to output the result of addition of those signals or a first offset added color difference signal to an overflow/underflow circuit 61. An adder 48 receives the color difference signal B-Y on one of inputs and a B-Y offset data DOFF(B-Y) on the other input to output the result of addition of those signals or a second offset added color difference signal to an overflow/underflow circuit 62. The R-Y offset data DOFF(R-Y) and the B-Y offset data DOFF(B-Y) are externally controllable digital data of several bits applied by an offset data applying means not shown.

The overflow/underflow circuit 61 receives the first offset added color difference signal and modifies the first offset added color difference signal in the event of occurrence of overflow or underflow in the first offset added color difference signal, or otherwise it outputs the non-modified first offset added color difference signal to the first input of the selector 43.

The overflow/underflow circuit 62 receives the second offset added color difference signal and modifies the second offset added color difference signal in the event of occurrence of overflow or underflow in the second offset added color difference signal, or otherwise it outputs the non-modified second offset added color difference signal to the second input of the selector 43.

The selector 42 and the selector 43 are controlled in their respective switching operations, similar to the first exemplary arrangement, based upon the multiple control signal SMC.

The selector 42, selector 43, selector 44, encoding unit 45 and subcarrier producing circuit 46 are all similar to their corresponding components in the first exemplary arrangement, and therefore, the description about them is omitted.

In such a arrangement, the adder 47 adds the R-Y offset data. DOFF(R-Y) to the color difference signal R-Y, and the overflow/underflow circuit 61 modifies it in the event of occurrence of flow to apply the first offset added color difference signal to the first input of the selector 43.

Similarly, the adder 48 adds the B-Y offset data DOFF(B-Y) to the color difference signal B-Y, and the overflow/underflow circuit 62 modifies it in the event of the occurrence of flow to apply the second offset added color difference signal to the second input of the selector 43.

Under the control of the multiple control signal SMC, an offset added color difference multiple signal derived from the first and second offset added color difference signals is obtained from the output of the selector 43 while a burst multiple signal derived from the R-Y burst data DBT(R-Y) and the B-Y burst data DBT(B-Y) is obtained from the output of the selector 42.

Under the control of the burst position signal SBP, the burst added color difference multiple signal of the offset added color difference multiple signal and the burst multiple signal added thereto is obtained from the output of the selector 44.

The encoding unit 45 performs balanced modulation of the subcarrier from the subcarrier producing circuit 46 using the burst added color difference multiple signal obtained from the output of the selector 44 and produces the digital chroma signal S41 to output it to the following D-A converter 10B.

In this way, in the second exemplary arrangement, the adders 47 and 48 add the R-Y offset data DOFF(R-Y) to the color difference signal R-Y and the B-Y offset data DOFF(B-Y) to the color difference signal B-Y, respectively, so as to adjust offsets of the color difference signals R-Y and B-Y. Furthermore, when the overflow/underflow occurs due to adding the offsets, the overflow/underflow circuits 61 and 62 can modify the signals.

<Digital Chroma Encoder (Third Exemplary Arrangement)>

Figure 16:
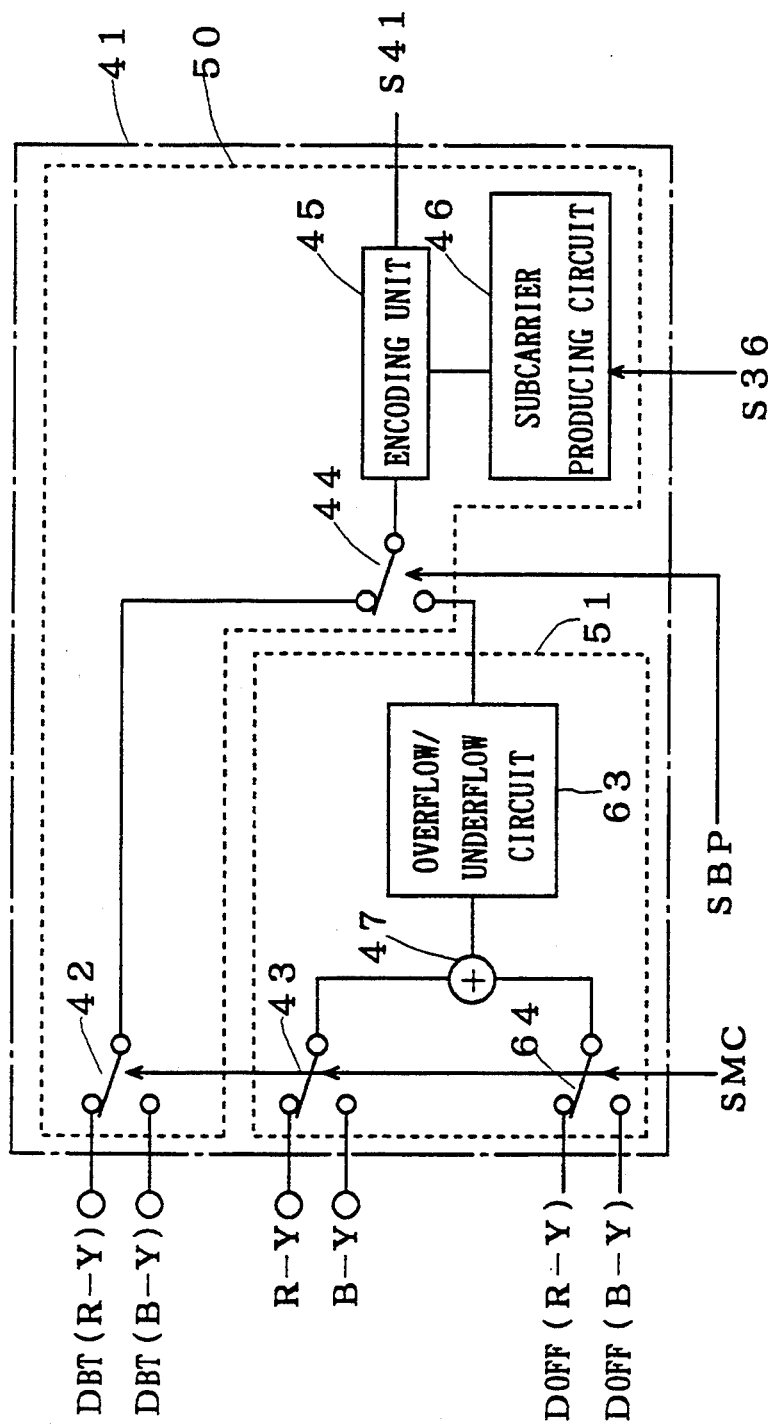
FIG. 16 is a block diagram showing a third exemplary configuration of the digital chroma encoder in FIG. 12.

FIG. 16 is a block diagram showing a third exemplary arrangement of the digital chroma encoder 41. As shown in FIG. 16, the R-Y burst data DBT(R-Y) is applied to the first input of the selector 42 while the B-Y burst data DBT(B-Y) is applied to the second input.

On the other hand, the color difference signal R-Y is applied to the first input of the selector 43 while the color difference signal B-Y is applied to the second input.

The R-Y offset data DOFF(R-Y) is applied to first one of inputs of a selector 64 while the B-Y offset data DOFF(B-Y) is applied to second one of the inputs.

The selector 42, selector 43 and selector 64 are controlled in their respective switching operations based upon the multiple control signal SMC.

Outputs of the selector 43 and the selector 64 work as first and second inputs of the adder 47. The output of the adder 47 is input as the offset added color difference multiple signal to the overflow/underflow circuit 63.

The overflow/underflow circuit 63 receives the offset added color difference multiple signal and modifies it in the event of occurrence of overflow or underflow in the offset added color difference multiple signal, or otherwise it outputs the non-modified offset added color difference multiple signal to the second input of the selector 44.

Hereinafter, an offset adjusting circuit 51 is defined as a circuit which is comprised of the selector 43, selector 64, adder 47 and overflow/underflow circuit 63, receiving the color difference signals R-Y and B-Y, R-Y offset data DOFF(R-Y) and B-Y offset data DOFF(B-Y) on its inputs and outputting the offset added color difference multiple signal from the overflow/underflow circuit 63 to the outside.

Outputs from the selector 42 and the overflow/underflow circuit 63 are applied to the first and second inputs of the selector 44, respectively.

The selector 44 is controlled in its switching operation based upon the burst position signal SBP to apply its output as the burst added color difference multiple signal to the encoding unit 45.

The encoding unit 45 receives the subcarrier from the subcarrier producing circuit 46 and modulates the subcarrier using the burst added color difference multiple signal obtained from the output of the selector 44.

Hereinafter, a basic encoder 50 is defined as a circuit which is comprised of the selector 42, selector 44, encoding unit 45 and subcarrier producing circuit 46, receiving external inputs or the R-Y burst data DBT(R-Y) and B-Y burst data DBT(B-Y) on the first input of the selector 44 and the various color difference multiple signals on the second input of the selector 44.

In such a arrangement, under the control of the multiple control signal SMC, the color difference multiple signal derived from the color difference signals R-Y and B-Y is obtained from the output of the selector 43 while the burst multiple signal derived from the R-Y burst data DBT(R-Y) and B-Y burst data DBT(B-Y) is obtained from the output of the selector 42. Furthermore, the offset multiple signal derived from the R-Y offset data DOFF(R-Y) and B-Y offset data DOFF(B-Y) is obtained from the output of the selector 64.

Then, the adder 47 adds the offset multiple signal to the color difference multiple signal, and the overflow-/underflow circuit 63 modifies it in the event of occurrence of the flow to apply the resultant signal as the offset added color difference multiple signal to the second input of the selector 44.

Under the control of the burst position signal SBP, the burst added color difference multiple signal of the offset added color difference multiple signal and the burst multiple signal added thereto is obtained from the output of the selector 44.

The encoding unit 45 performs balanced modulation of the subcarrier from the subcarrier producing circuit 46 using the burst added color difference multiple signal and produces the digital chroma signal S41 to output it to the following D-A converter 10B.

As has been described, in the third exemplary arrangement, the adder 47 adds the R-Y offset data DOFF(R-Y) and B-Y offset data DOFF(B-Y) to the color difference signals R-Y and B-Y, respectively, so that offsets of the color difference signals R-Y and B-Y can be adjusted. When the overflow or underflow occurs due to addition of the offsets, the overflow/underflow circuit 63 can modify it.

This arrangement is designed so as to modify the overflow or underflow on the offset added color difference multiple signals, and therefore, one of the adders and one of the overflow/underflow circuits may be eliminated, compared with the second exemplary arrangement.

<Digital Chroma Encoder (Fourth Exemplary Arrangement)>

Figure 17:
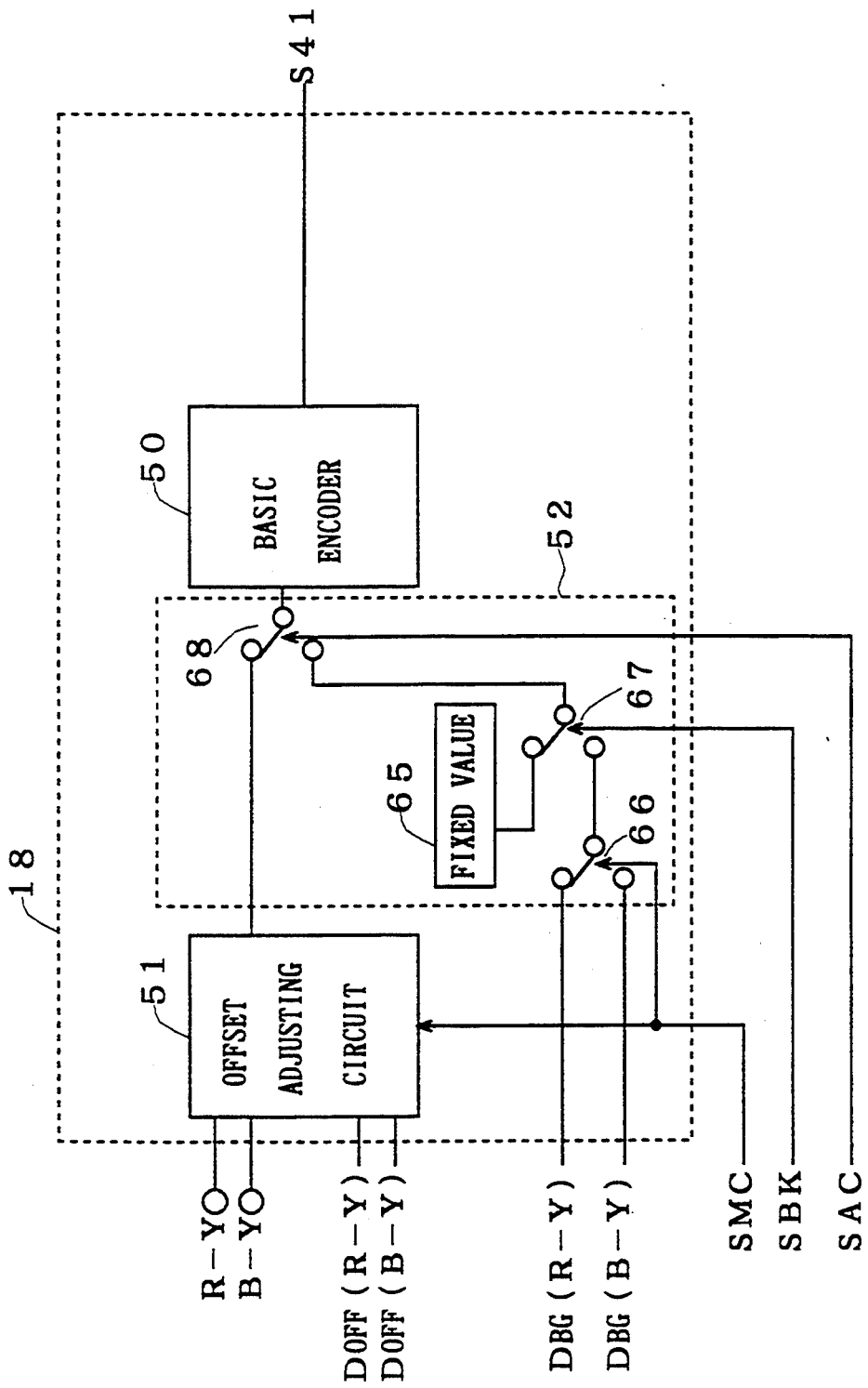
FIG. 17 is a block diagram showing a fourth exemplary configuration of the digital chroma encoder in FIG. 12.

FIG. 17 is a block diagram showing a fourth exemplary arrangement of the digital chroma encoder 41. As shown in FIG. 17, this arrangement is different from the above third exemplary arrangement in that a blanking background apply circuit 52 is interposed between a basic encoder and an offset adjusting circuit 51.

The blanking background apply circuit 52 consists of a fixed value data 65, a selector 66, a selector 67 and a selector 68.

R-Y background data DBG(R-Y) is applied to one of inputs of the selector 66 while B-Y background data DBG(B-Y) is applied to the other input. The R-Y background data DBG(R-Y) and the B-Y background data DBG(B-Y), which are several-bit digital data, can be respectively input from the outside, and they are applied during a period without data after transformation into the NTSC mode (a background period) and are applied by a background data applying means not shown. The selector 66 is controlled in its switching operation based upon the multiple control signal SMC.

The fixed value data 65 for setting the blanking period is applied to first one of inputs of the selector 67 while output of the selector 66 is applied to second one of the inputs of the selector 67. The selector 67 is controlled in its switching operation based upon a blanking signal SBK. The blanking signal SBK is a timing signal which designates connection to the first input of the selector 67 during the blanking period while it designates connection to the second input of the selector 67 during the remaining period.

Output from the offset adjusting circuit 51 or an offset added color difference multiple signal is applied to first one of inputs of the selector 68 while output from the selector 67 is applied to second one of the inputs of the selector 68. The selector 68 is controlled in its switching operation based upon an area switch signal SAC. The area switch signal SAC designates connection to the second input of the selector 68 during the blanking period or the background period while it designates connection to the first input of the selector 68 during the remaining period.

An operation of the blanking background apply circuit 52 will now be described. Under the control of the multiple control signal SMC, a background multiple signal derived from the R-Y background data DBG(R-Y) and the B-Y background data DBG(B-Y) is obtained from the output of the selector 66.

Then, under the control of the blanking signal SBK, a blanking-background multiple signal of the background multiple signal and the blanking data (fixed value data 65) added thereto is obtained from the output of the selector 67.

Moreover, under the control of the area switch signal SAC, an offset added color difference multiple signal and the blanking-background multiple signal added thereto is applied from the output of the selector 68 to the basic encoder 50.

Then, the basic encoder 50 encodes the offset added color difference multiple signal to which the blanking-background multiple signal is further added. In FIG. 17, the R-Y burst data DBT(R-Y) and the B-Y burst data DBT(B-Y) input to the basic encoder 50 are not illustrated.

In this way, in the fourth exemplary arrangement, the blanking background apply circuit 52 enables the digital chroma signal S41 of the offset added color difference multiple signal and the blanking-background data further added thereto to be obtained.

<Digital Chroma Encoder (Fifth Exemplary Arrangement)>

Figure 18:
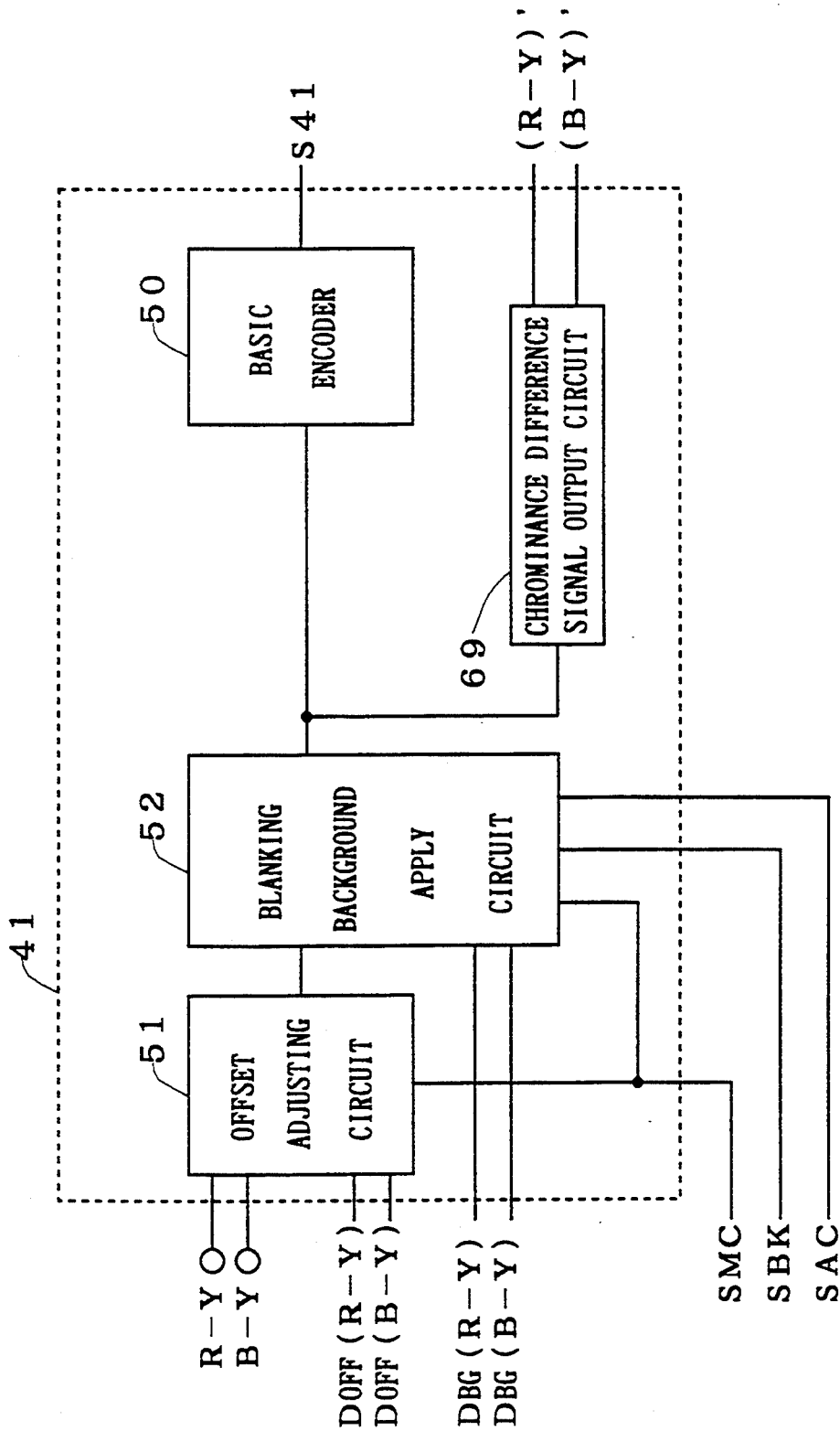
FIG. 18 is a block diagram showing a fifth exemplary configuration of the digital chroma encoder in FIG. 12.

FIG. 18 is a block diagram showing a fifth exemplary arrangement of the digital chroma encoder 41. As shown in FIG. 18, this arrangement is different from the fourth exemplary arrangement in that output from the blanking background apply circuit 52 is output to the basic encoder 50 and to a newly provided color difference signal output circuit 69.

The color difference signal output circuit 69 receives an offset added color difference multiple signal to which the blanking-background multiple signal obtained from the output of the blanking background apply circuit 52 is further added, and it separates this signal into a color difference signal R-Y component and a color difference signal B-Y component to externally output them as a color difference signal (R-Y)' and a color difference signal (B-Y)'.

In this way, in the fifth exemplary arrangement, similar to the fourth exemplary arrangement, the digital chroma signal S41 produced by encoding the offset added color difference multiple signal to which the blanking-background multiple signal is further added.

Moreover, the fifth exemplary arrangement has the color difference signal output circuit 69 which works to separate the color difference multiple signal processed in the offset adjusting circuit 51 and the blanking background apply circuit 52 into the color difference signals (R-Y)' and (B-Y)' and output them to the outside.

<Digital Chroma Encoder (Sixth Exemplary Arrangement)>

In order to modify the difference between a luminance equation in the MUSE mode and that in the NTSC mode, it is desirable to multiply each of the color difference signals R-Y and B-Y transformed with the NTSC mode signals by a coefficient for modification. Sixth and seventh exemplary arrangements mentioned below fill this requirement.

Figure 19:
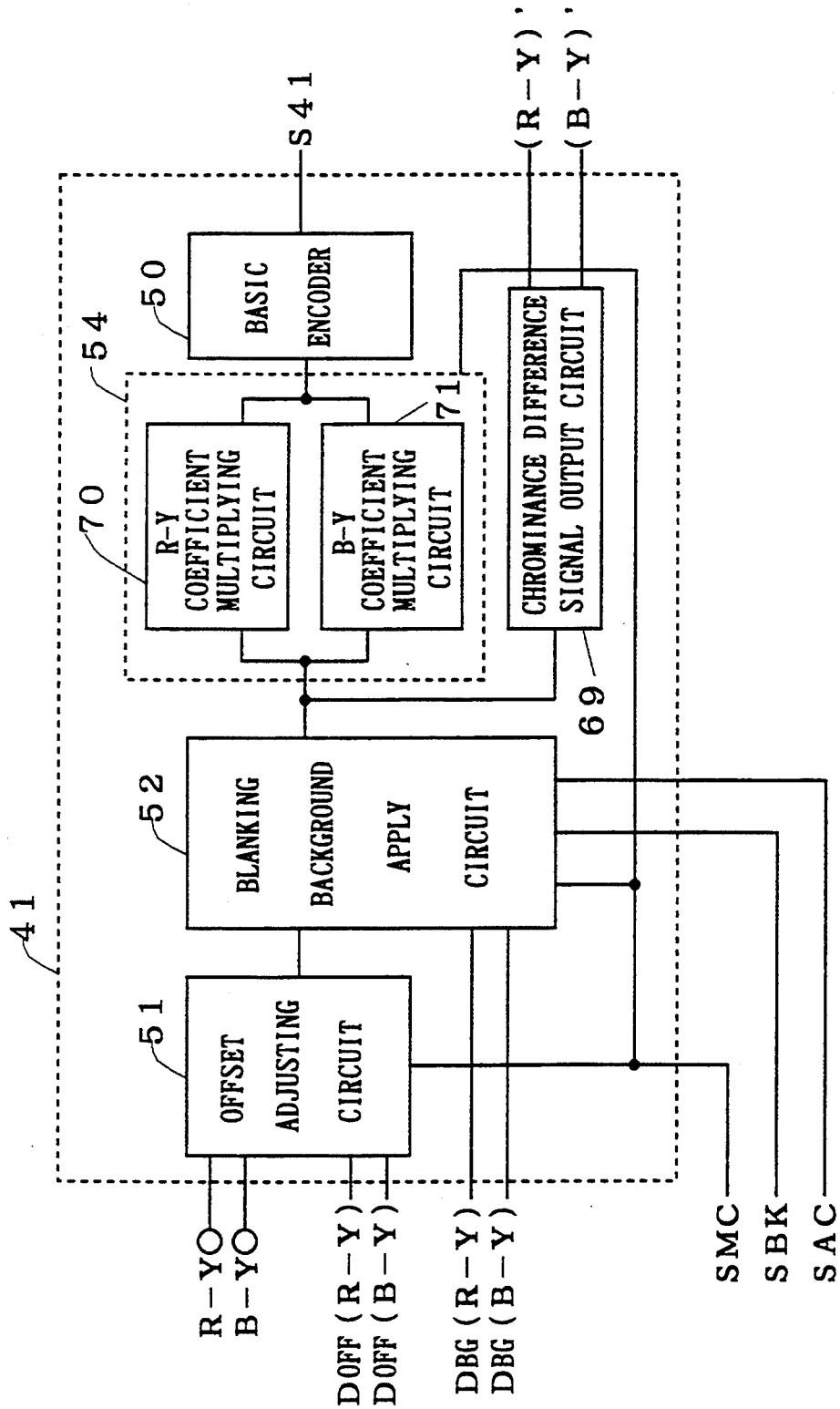
FIG. 19 is a block diagram showing a sixth exemplary configuration of the digital chroma encoder in FIG. 12.

FIG. 19 is a block diagram showing the sixth exemplary arrangement of the digital chroma encoder 41. As shown in FIG. 19, this arrangement is different from the fifth exemplary arrangement in that a coefficient multiplying circuit 54 is interposed between the blanking background apply circuit 52 and the basic encoder 50.

The coefficient multiplying circuit 54, consisting of an R-Y coefficient multiplying circuit 70 and a B-Y coefficient multiplying circuit 71, receives the blanking-background data containing offset added color difference multiple signal from the blanking background apply circuit 52 and uses the multiple control signal SMC as a control signal. The R-Y coefficient multiplying circuit 70 and the B-Y coefficient multiplying circuit 71 are circuits which respectively multiply input signals by specified coefficients RY and BY to output resultant signals, respectively.

Now an operation of the coefficient multiplying circuit 54 will be described.

Under the control of the multiple control signal SMC, the coefficient multiplying circuit 54 uses the R-Y coefficient multiplying circuit 70 to multiply the blanking-background data containing offset added color difference multiple signal by the coefficient RY and output the resultant signal when the multiple control signal SMC designates the color difference signal R-Y while it uses the B-Y coefficient multiplying circuit 71 to multiply the blanking-background data containing offset added color difference multiple signal by the coefficient BY and output the resultant signal when the multiple control signal SMC designates the color difference signal B-Y.

The basic encoder 50 encodes the blanking-background data containing offset added color difference multiple signal which has been modified by multiplication by the coefficient.

As previously mentioned, the sixth exemplary arrangement works to divide the blanking-background data containing offset added color difference multiple signal into the color difference signal R-Y component and the color difference signal B-Y component to obtain the digital chroma signal S41 modified by multiplication by the coefficient.

Similar to the fifth exemplary arrangement, the color difference signal output circuit 69 may separate the color difference multiple signal processed in the offset adjusting circuit 51 and the blanking background adding circuit 52 into the color difference signals (R-Y)' and (B-Y)' to output them to the outside.

<Digital Chroma Encoder (Seventh Exemplary Arrangement)>

As has been described, desirably multiplying the color difference signals R-Y and B-Y transformed into the NTSC mode signals by the respective coefficients for modification to modify a difference between the luminance equation in the MUSE mode and that in the NTSC mode.

However, it should be noted in a seventh exemplary arrangement that the coefficients for respectively modifying the color difference signals R-Y and B-Y should not be determined independently and that a ratio of the coefficient for modifying the color difference signal R-Y with the coefficient for modifying the color difference signal B-Y may fill a specific requirement.

Figure 20:
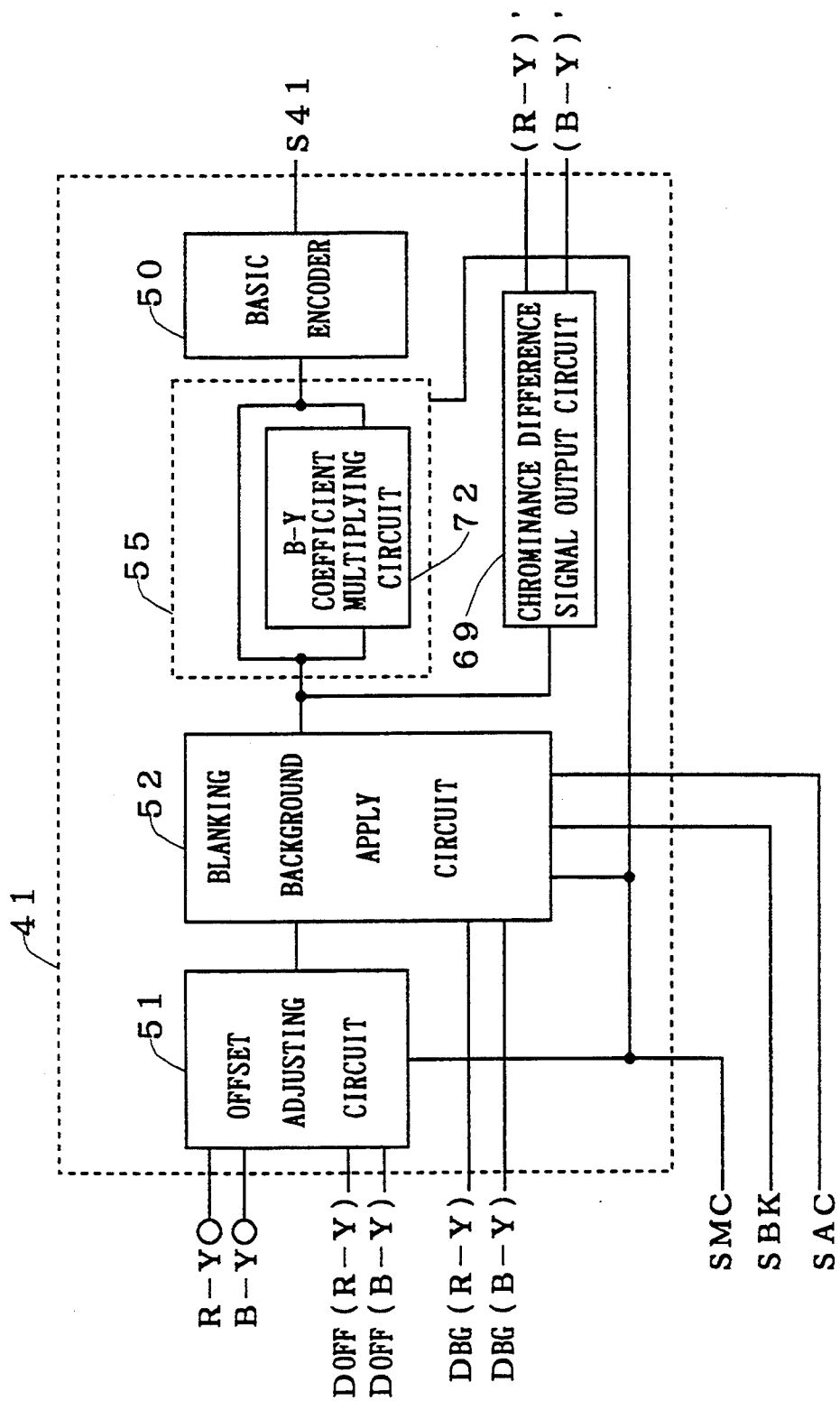
FIG. 20 is a block diagram showing a seventh exemplary configuration of the digital chroma encoder in FIG. 12.

FIG. 20 is a block diagram showing the seventh exemplary arrangement of the digital chroma encoder 41. As shown in FIG. 20, this arrangement is different from the sixth exemplary arrangement in that a coefficient multiplying circuit 55 is substituted for the coefficient multiplying circuit 54.

The coefficient multiplying circuit 55, consisting of a B-Y coefficient multiplying circuit 72, receives the blanking-background data containing offset added color difference multiple signal and uses the multiple control signal SMC as a control signal. The B-Y coefficient multiplying circuit 72 multiplies the input signal by a specific coefficient BY' to output the resultant signal.

An operation of the coefficient multiplying circuit 55 will now be described.

The coefficient multiplying circuit 55, under the control of the multiple control signal SMC, outputs the offset blanking-background data containing color difference multiple signal without modification when the multiple control signal SMC designates the color difference signal R-Y while it uses the B-Y coefficient multiplying circuit 72 to multiple the blanking-background data containing offset added color difference multiple signal by the coefficient BY' and outputs the resultant signal when the multiple control signal SMC designates the color difference signal B-Y.

As has been described, the seventh exemplary arrangement produces the digital chroma signal S41 which is obtained by multiplying the color difference signal B-Y alone of the blanking-background data containing offset added color difference multiple signal by the coefficient BY'. In this case, compared with the sixth exemplary arrangement, the number of the circuits for multiple signals by the coefficients can be advantageously reduced by one.

Also, similar to the fifth and sixth exemplary arrangements, the color difference signal output circuit 69 effectively separating the input signal processed in the offset adjusting circuit 51 and the blanking background adding circuit 52 into the color difference signals (R-Y)' and (B-Y)' to output them to the outside.

Although, in the seventh exemplary arrangement, the coefficient multiplying circuit 55 which multiplies the color difference signal B-Y alone by the coefficient has been described, similar effects can certainly be attained by the coefficient multiplying circuit for multiplying the color signal R-Y alone by the coefficient so that a ratio of the coefficient for modifying the color difference signal R-Y with the coefficient for modifying the color difference signal B-Y may fill the specified requirement.

<Digital Chroma Encoder (Eighth Exemplary Arrangement)>

In the process of transforming from the MUSE mode into the NTSC mode, because of different factors between them in system clock, field and frame frequency, a-phase of the desired chrominance subcarrier signal sometimes deviates from the standard. Especially, the chrominance subcarrier signal must be sometimes inverted in its phase from a first group of flames (odd flames) to a second group of flames (even flames). In such a case, as in the standard NTSC mode, the phase of the chrominance subcarrier signal must be inverted from even frames to odd flames. An eighth exemplary arrangement is designed to fill this requirement.

Figure 21:
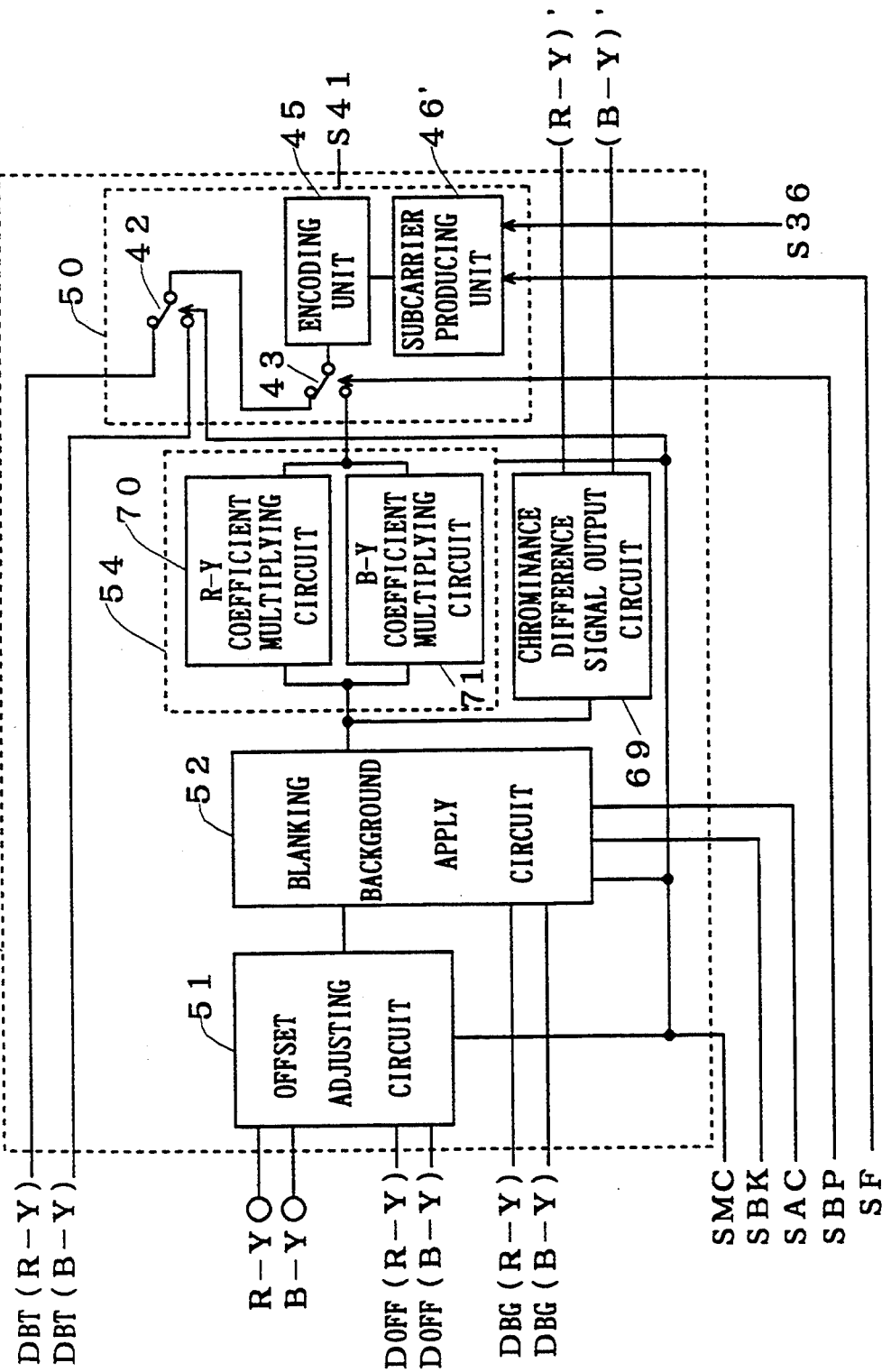
FIG. 21 is a block diagram showing a eighth exemplary configuration of the digital chroma encoder in FIG. 12.

FIG. 21 is a block diagram showing the eighth exemplary arrangement of the digital chroma encoder 41. As shown in FIG. 21, this arrangement is different from the sixth exemplary arrangement in that a subcarrier producing circuit 46' is substituted for the subcarrier producing circuit 46 of the basic encoder 50.

The subcarrier producing circuit 46' receives a frame signal SF and identifies whether a signal to be encoded is of the first group of flames (odd frames) or the second group of flames (even flames) in accordance with the frame signal SF.

Figure 22:
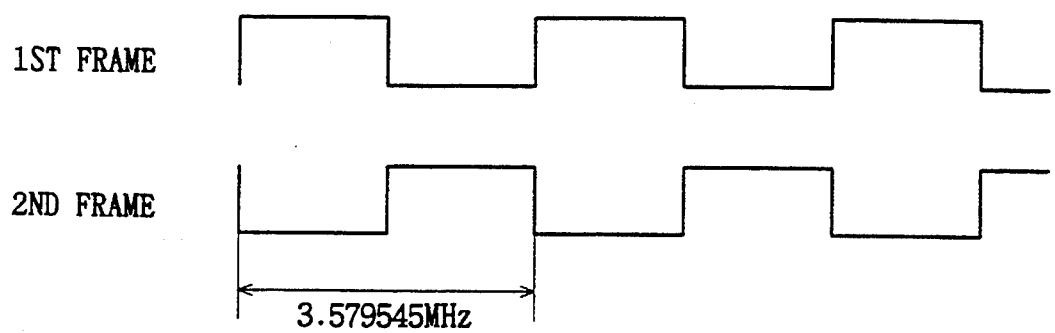
FIG. 22 is a waveform diagram illustrating an operation of the digital chroma encoder in FIG. 21.

Further, the subcarrier producing circuit 46' inverts the phase of the subcarriers from a frame of the first group to a frame of the second group to output the resultant signals, as shown in FIG. 22, to the encoding unit 45.

In this way, the subcarrier producing circuit 46' of the eighth exemplary arrangement is capable of producing subcarriers which are adjusted to the difference in phase between flames caused in transforming the MUSE mode to the NTSC mode.

<NTSC Timing Signal Generating Circuit (Sample 2)>

Figure 23:
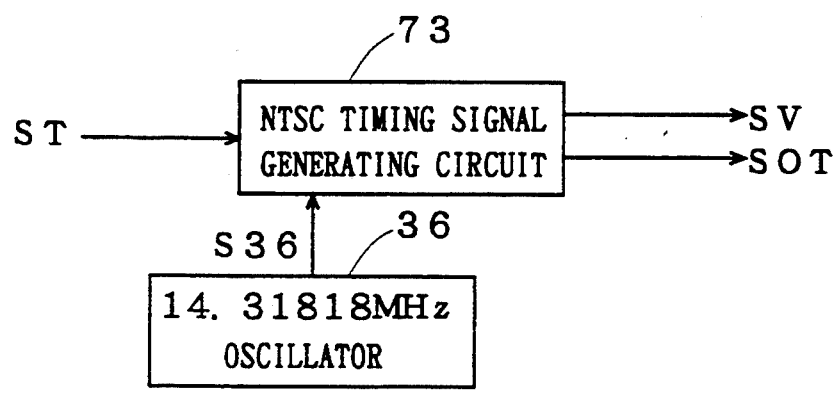
FIG. 23 is a block diagram showing an NTSC timing signal generating circuit (Sample 2)
Figure 24:
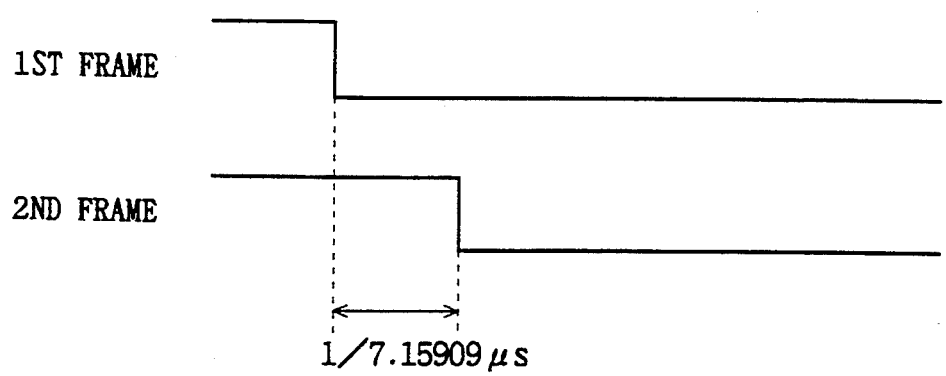
FIG. 24 is a waveform diagram illustrating an NTSC timing signal generating circuit in FIG. 23.
Figure 27:
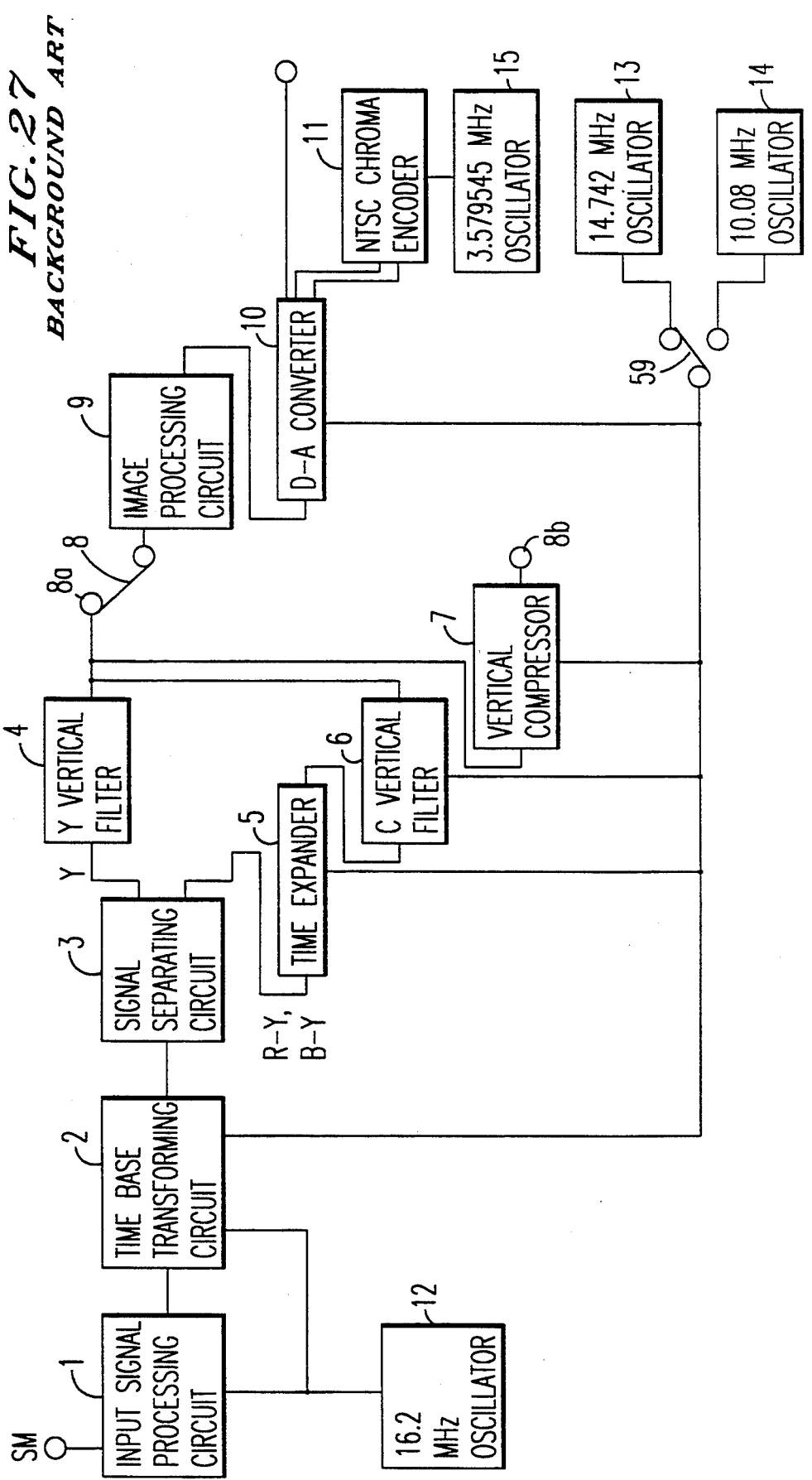
FIG. 27 is a block diagram showing a configuration of a prior art MUSE-NTSC converter.

FIG. 23 is a diagram showing an NTSC timing signal generating circuit. As shown in FIG. 23, an NTSC timing signal generating circuit 73 receives a trigger signal ST from the MUSE and the oscillation signal from the 14.31818 MHz oscillator 36 to output a vertical synchronizing signal SV and other timing signals SOT (including the multiple control signal SMC and the like). The NTSC timing signal generating circuit 73 is a circuit provided independently of various components in the MUSE-NTSC converter shown in FIG. 1 and may be substituted for the NTSC timing signal generating circuit 58 shown in FIG. 27.

In such an arrangement, the NTSC timing signal generating circuit 73 delays the phase of the vertical synchronizing signal SV during a period for the second group of frames by $(1/7.15909)\mu S$ from the phase for the first group of frames. Meanwhile, the timing signals SOT other than the above are output as usual.

In this way, the NTSC timing signal generating circuit 73 shown in FIG. 23 can output the vertical synchronizing signal SV adjusted to the difference in phase between the frames caused in transforming the MUSE mode into the NTSC mode.

<<Embodiment 3>>

Figure 25:
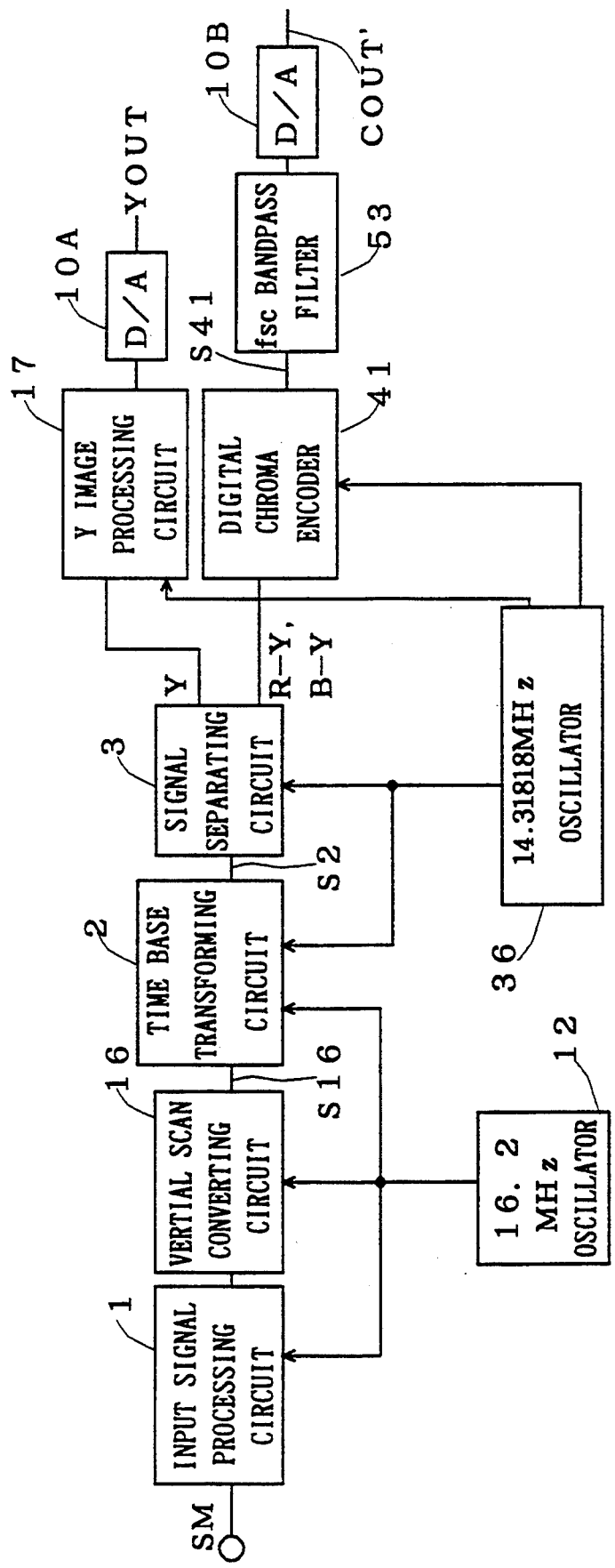
FIG. 25 is a block diagram showing a configuration of a MUSE-NTSC converter of a third preferred embodiment according to the present invention.

FIG. 25 is a block diagram showing a MUSE-NTSC converter of a third preferred embodiment according to the present invention.

As shown in FIG. 25, this embodiment is different from the second preferred embodiment in that an fsc bandpass filter 53 is interposed between a digital chroma encoder 41 and a D-A converter 10B, as shown in FIG. 25.

The fsc bandpass filter 53 receives a digital chroma signal S41 from the digital chroma encoder 41, performs the bandpass filtering about the subcarrier frequency on the digital chroma signal S41, and outputs the resultant signal to the D-A converter 10B.

The D-A converter 10B produces from its output to the outside a chroma signal COUT' which has undergone the bandpass filtering. Other components and their arrangement are similar to those of the MUSE-NTSC converter of the second preferred embodiment shown in FIG. 12, and therefore, the description is omitted.

In this way, the MUSE-NTSC converter of the third preferred embodiment, containing the fsc bandpass filter 53, can output to the outside the chroma signal COUT' which has undergone the bandpass filtering process.

Thus, for the D-A converted digital chroma signal S41 or the chroma signal COUT, it is needless that the following device receiving the chroma signal COUT has a bandpass filter about the analog subcarrier frequency.

As a result, same lowpass filters are provided for the luminance output signal YOUT and the chroma output signal COUT' respectively output from the D-A converters 10A and 10B, and hence, the luminance output signal YOUT and the chroma output signal COUT' are not out of phase from each other.

As has been described, in the MUSE-NTSC converters as described in the appended claims 1 to 5, the second oscillating means outputs the second oscillation signal of the second frequency acting as a system clock for the NTSC mode signal, and since the second frequency is set to the product of the subcarrier frequency of the NTSC mode signal and any integer, the signal processing means can produce a subcarrier based upon the second oscillation signal.

The signal separating means receives the second oscillation signal and the NTSC mode signal and varies kinds of the signal separation processing depending upon features of the NTSC mode to separately output the desired NTSC mode luminance signal and color difference signal derived from the NTSC mode signal, and thus, only one kind of system clock, namely, the second oscillation signal, is needed regardless of the features of the NTSC mode.

As a result, only one PLL circuit required for transforming an MUSE mode signal into an NTSC mode signal, namely, the PLL circuit synchronizing in phase the first oscillation signal with the second oscillation signal, is needed, and thus, a MUSE-NTSC converter having a simple circuit arrangement can be implemented.

In the MUSE-NTSC converter as described in the appended claims 6 to 15 in this writing, the second oscillation means outputs the second oscillation signal of the second frequency working as a system clock for the NTSC mode signal, where the second frequency is set to the product of the subcarrier frequency of the NTSC mode signal and any integer multiplied by four.

Thus, the digital chroma encoding means alternately samples the first and second color difference signals at a timing of the frequency four times as large as the subcarrier, so as to facilitate production of a composite signal of the first and second color difference signals, or the chroma signal.

Eventually, without any analog-basis encoding means in the prior art, the digital chroma encoding means of this invention can practice an encoding operation on the first and second color difference signals on the basis of digital processing, and thus, an MUSE-NTSC converter of a small circuit scale can be obtained.

While the invention has been shown and described in detail, the foregoing description is in all aspects illustrative and not restrictive. It is therefore understood that numerous modifications and variations can be devised without departing from the scope of the invention.

What is claimed is:

1. A MUSE-NTSC converter comprising:
    first oscillating means for producing a first oscillation signal of a first frequency working as a system clock for a MUSE mode signal;
    second oscillating means for producing a second oscillation signal of a second frequency working as a system clock for an NTSC mode signal, said second frequency being set to an integral multiple of a frequency of a subcarrier of said NTSC mode signal;
    time-base transforming means receiving said MUSE mode signal and said first and second oscillation signals for transforming said MUSE mode signal on a time-base from said first frequency to said second frequency based upon said first and second oscillation signals to output said NTSC mode signal;
    signal separating means receiving said second oscillation signal and said NTSC mode signal for signal separation processing depending upon features of said NTSC mode and separating said NTSC mode signal into a luminance signal and a color difference signal;
    luminance signal processing means receiving said second oscillation signal and said luminance signal for processing said luminance signal based upon said second oscillation signal;
    chroma encoding means receiving said second oscillation signal and said color difference signal for processing said color difference signal based upon said second oscillation signal, producing said subcarrier from said second oscillation signal, and using said subcarrier to modulate said color difference signal; and
    a PLL circuit for synchronizing said first and second oscillation signals in phase.

2. A MUSE-NTSC converter according to claim 1, wherein said PLL circuit includes:
    first frequency dividing means for dividing a frequency of said first oscillation signal with a first frequency dividing ratio to output a first frequency divided signal;
    second frequency dividing means for dividing a frequency of said second oscillation signal with a second frequency dividing ratio to output a second frequency divided signal; and
    phase comparing means for detecting a phase difference between said first and second frequency divided signals to produce a signal based upon said phase difference as a phase control signal for controlling a phase of said second oscillation signal from said second oscillating means.

3. A MUSE-NTSC converter according to claim 2, wherein said first frequency is 32.4 MHz,
    said second frequency is 28.63636 MHz,
    said first frequency dividing ratio is 1/3375, and
    said second frequency dividing ratio is 1/2983.

4. A MUSE-NTSC converter according to claim 2, wherein said first frequency is 32.4 MHz,
    said second frequency is 28.63636 MHz,
    said first frequency dividing ratio is 1/180000, and
    said second frequency dividing ratio is 1/159091.

5. A MUSE-NTSC converter according to claim 2, wherein said first frequency is 32.4 MHz,
    said second frequency is 28.63636 MHz,
    said first frequency dividing ratio is 1/21600, and
    said second frequency dividing ratio is 1/19091.

6. A MUSE-NTSC converter comprising
    first oscillating means for producing a first oscillation signal of a first frequency working as a system clock for a MUSE mode signal;
    second oscillating means for producing a second oscillation signal of a second frequency working as a system clock for an NTSC mode signal, said second frequency being set to an integral multiple of four times a frequency of a subcarrier of said NTSC mode signal;
    time-base transforming means receiving said MUSE mode signal and said first and second oscillation signals for transforming a MUSE mode signal on said time-base from said first frequency to said second frequency based upon said first and second oscillation signals to output said NTSC mode signal;
    signal separating means receiving said second oscillation signal and said NTSC mode signal for separating said NTSC mode signal into a luminance signal and first and second color difference signals out of phase by 90° from each other;
    luminance signal processing means receiving said second oscillation signal and said luminance signal for processing said luminance signal based upon said second oscillation signal to output a resultant processed luminance signal;
    digital chroma encoding means receiving said second oscillation signal and said first and second color difference signals for performing digital-basis signal processing to a color difference multiple signal obtained by alternately sampling said first and second color difference signals at a sampling timing of four times as much as said frequency of said subcarrier based upon said second oscillation signal, producing said subcarrier based upon said second oscillation signal, and encoding processing by modulating said subcarrier with said color difference multiple signal to produce a digital chroma signal;
    first D-A converting means for D-A converting said processed luminance signal processed in said luminance signal processing means to produce a resultant analog luminance signal; and
    second D-A converting means for D-A converting said digital chroma signal to produce an analog chroma signal.

7. A MUSE-NTSC converter according to claim 6, wherein said digital chroma encoding means includes:
    color difference signal multiplying means for alternately sampling said first and second color difference signals at said sampling timing to produce said color difference multiple signal;
    burst applying means for applying first and second burst data;
    burst multiplying means for alternately sampling said first and second burst data at said sampling timing to produce a burst multiple signal;
    burst adding means for adding said burst multiple signal to said color difference multiple signal to produce a burst added color difference multiple signal; and
    encoding means producing said subcarrier based upon said second oscillation signal for encoding processing by modulating said subcarrier with said burst added color difference multiple signal to produce said digital chroma signal.

8. A MUSE-NTSC converter according to claim 6, wherein said digital chroma encoding means includes:
burst data applying means for applying first and second burst data;
burst multiplying means for alternately sampling said first and second burst data at said sampling timing to produce a burst multiple signal;
offset data applying means for applying first and second offset data;
first adding means for adding said first color difference signal and said first offset data to produce a first offset added color difference signal;
second adding means for adding said second color difference signal and said second offset data to produce a second offset added color difference signal;
first overflow/underflow modifying means receiving said first offset added color difference signal for modifying said first offset added color difference signal when detecting said overflow or underflow of said first offset added color difference signal;
second overflow/underflow modifying means receiving said second offset added color difference signal for modifying said second offset added color difference signal when detecting said overflow or underflow of said second offset added color difference signal;
color difference signal multiplying means for sampling said first and second offset added color difference signals at said sampling timing to produce an offset added color difference multiple signal;
burst adding means for adding said burst multiple signal to said offset added color difference multiple signal to produce a burst containing color difference multiple signal; and
encoding means for producing said subcarrier based upon said second oscillation signal and encoding processing by modulating said subcarrier with said burst containing color difference multiple signal to produce said digital chroma signal.

9. A MUSE-NTSC converter according to claim 6, wherein said digital chroma encoding means includes:
color difference signal multiplying means for alternately sampling said first and second color difference signals at said sampling timing to produce said color difference multiple signal;
burst data applying means for applying first and second burst data;
burst multiplying means for alternately sampling said first and second burst data at said sampling timing to produce a burst multiple signal;
offset data applying means for applying first and second offset data;
offset multiplying means for alternately sampling said first and second offset data at said sampling timing to produce an offset multiple signal;
adding means for adding said color difference multiple signal and said offset multiple signal to produce an offset added color difference multiple signal;
overflow/underflow modifying means receiving said offset added color difference multiple signal for modifying said offset added color difference multiple signal when detecting said overflow or underflow of said offset added color difference multiple signal;
burst adding means for adding said burst multiple signal to said offset added color difference multiple signal to produce a burst containing a color difference multiple signal; and
encoding means for producing said subcarrier based upon said second oscillation signal, encoding processing by modulating said subcarrier with said burst containing said color difference multiple signal to produce said digital chroma signal.

10. A MUSE-NTSC converter according to claim 9, wherein said digital chroma encoding means includes:
background data applying means for applying first and second background data;
background multiplying means for alternately sampling said first and second background data at said sampling timing to produce a background multiple signal;
blanking data applying means for applying blanking data;
blanking data adding means for adding said blanking data to said background multiple signal to produce a blanking-background multiple signal; and
blanking background adding means for adding said blanking-background multiple signal to said offset added color difference multiple signal.

11. A MUSE-NTSC converter according to claim 10, further comprising:
color difference signal output means receiving said offset added color difference multiple signal to which said blanking-background multiple signal is further added, for separating and outputting said offset added color difference multiple signal into first and second color difference signal components.

12. A MUSE-NTSC converter according to claim 11, further comprising:
coefficient modifying means receiving said offset added color difference multiple signal to which said blanking-background multiple signal is further added, for multiplying at least one of said first and second color difference signal components of said offset added color difference multiple signal by a coefficient to perform coefficient modification between said first and second color difference signal components of said offset added color difference multiple signal.

13. A MUSE-NTSC converter according to claim 12, further comprising:
frame signal applying means for applying a frame signal for designating an NTSC mode frame cycle;
said encoding means including subcarrier producing means for producing said subcarrier based upon said second oscillation signal, said subcarrier producing means including means receiving said frame signal for varying a phase between frames of said subcarrier in accordance with a difference of said phase between frames of said NTSC mode signal.

14. A MUSE-NTSC converter according to claim 6, further comprising:
vertical synchronizing signal applying means for applying a vertical synchronizing signal; and
NTSC timing signal generating means receiving said vertical synchronizing signal and said second oscillation signal for alternately outputting said vertical synchronizing signal and a delayed vertical synchronizing signal delayed by a specified period of time from said vertical synchronizing signal frame by frame in accordance with said phase difference between said frames of said NTSC mode signal.

15. A MUSE-NTSC converter according to claim 6, further comprising:

digital bandpass filtering means interposed between said digital chroma encoding means and said D-A converting means and receiving said digital chroma signal for performing said digital-basis bandpass filtering to said digital chroma signal to output said digital chroma signal to said second D-A converting means.

* * * * *